United States Patent
Kawasaki et al.

(10) Patent No.: US 11,844,130 B2
(45) Date of Patent: Dec. 12, 2023

(54) USER EQUIPMENT, CONTROL DEVICE, AND COMMUNICATION CONTROL METHOD

(71) Applicant: SHARP KABUSHIKI KAISHA, Sakai (JP)

(72) Inventors: Yudai Kawasaki, Sakai (JP); Tsuyoshi Takakura, Sakai (JP); Masafumi Aramoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 326 days.

(21) Appl. No.: 17/282,602

(22) PCT Filed: Oct. 4, 2019

(86) PCT No.: PCT/JP2019/039333
§ 371 (c)(1),
(2) Date: Apr. 2, 2021

(87) PCT Pub. No.: WO2020/071543
PCT Pub. Date: Apr. 9, 2020

(65) Prior Publication Data
US 2021/0360722 A1    Nov. 18, 2021

(30) Foreign Application Priority Data
Oct. 5, 2018    (JP) .................................. 2018-189950

(51) Int. Cl.
*H04W 76/18*    (2018.01)
*H04W 48/18*    (2009.01)
*H04W 60/04*    (2009.01)

(52) U.S. Cl.
CPC ........... *H04W 76/18* (2018.02); *H04W 48/18* (2013.01); *H04W 60/04* (2013.01)

(58) Field of Classification Search
CPC ..... H04W 76/18; H04W 48/18; H04W 60/04; H04W 8/22; H04W 76/12
(Continued)

(56) References Cited

U.S. PATENT DOCUMENTS

2019/0174449 A1* 6/2019 Shan ..................... H04W 60/00

OTHER PUBLICATIONS

3GPP TS 23.501 v15.3.0 (Sep. 2018); 3rd Generation Partnership Project; Technical Specification Group Services and System Aspects; System Architecture for the 5G System; Stage 2 (Release 15).
(Continued)

*Primary Examiner* — Huy C Ho
(74) *Attorney, Agent, or Firm* — ScienBiziP, P.C.

(57) ABSTRACT

Provided is a communication unit for implementing error processing of a control device of a core network and error processing of User Equipment in a case that connectivity to a Local Area Data Network (LADN) is not able to be provided in a 5GS. Provided is a communication unit for implementing error processing in which a request for establishing connectivity to a Local Area Data Network (LADN) requested by a user equipment is rejected by a control device of a core network in a case that the connectivity to the LADN is not able to be provided in a 5GS. Further, a communication unit for implementing appropriate error processing that User Equipment performs in a case that a request for establishing connectivity to the LADN is rejected.

5 Claims, 7 Drawing Sheets

(58) Field of Classification Search
USPC .......................................................... 370/329
See application file for complete search history.

(56) References Cited

OTHER PUBLICATIONS

3GPP TS 23.502 v15.3.0 (Sep. 2018); 3rd Generation Partnership Project; Technical Specification Group Services and System Aspects; Procedures for the 5G System; Stage 2 (Release 15).
3GPP TS 24.501 v15.1.0 (Sep. 2018); 3rd Generation Partnership Project; Technical Specification Group Core Network and Terminals; Non-Access-Stratum (NAS) protocol for 5G System (5GS); Stage 3 (Release 15).
Sharp, "Pseudo-CR on UE behavior upon reception of DNN not supported cause", C1-175410 3GPP TSG-CT WG1 Meeting #107, Reno (USA), Nov. 27-Dec. 1, 2017.

* cited by examiner

USER EQUIPMENT, CONTROL DEVICE, AND COMMUNICATION CONTROL METHOD

TECHNICAL FIELD

The present disclosure relates to user equipment, a control device, and a communication control method. This application claims priority based on Japanese Patent Application No. 2018-189950 filed on Oct. 5, 2018, the contents of which are incorporated herein by reference.

BACKGROUND ART

In the 3rd Generation Partnership Project (3GPP), studies on system architectures for a 5G System (5GS), which is a mobile communication system of the next generation, or the 5th Generation (5G), has been started, and support for new procedures and new functions has been discussed (see Non Patent Literature 1 and 2).

For example, optimization and diversification of communication procedures for supporting continuous mobile communication services in accordance with a variety of services, and optimization of system architecture in accordance with optimization and diversification of communication procedures have also been listed as required conditions.

CITATION LIST

Non Patent Literature

NPL 1: 3GPP TS 23.501 v15.3.0 (2018-09); Technical Specification Group Services and System Aspects; System Architecture for the 5G System; Stage 2 (Release 15)
NPL 2: 3GPP TS 23.502 v15.3.0 (2018-09); Technical Specification Group Services and System Aspects; Procedures for the 5G System; Stage 2 (Release 15)
NPL 3: 3GPP TS 24.501 v15.1.0 (2018-09); Technical Specification Group Core Network and Terminals; Non-Access-Stratum (NAS) protocol for 5G System (5GS); Stage 3 (Release 15)

SUMMARY OF INVENTION

Technical Problem

In a 5G System (5GS), a 5G Core Network (5GCN) that is a new core network has been studied to provide a variety of services. Note that in a 5GS, new functions including a function for providing connectivity to a Local Area Data Network (LADN) are supported.

However, processing performed by a control device of a core network and processing performed by user equipment in a case that connectivity to a LADN cannot be provided are not clearly distinguished.

An aspect of the present invention was made in view of the aforementioned circumstances, and an object thereof is to provide a method for realizing error processing of a control device of a core network and error processing of user equipment in a case in which connectivity to a LADN in the 5GS cannot be provided.

Solution to Problem

A User Equipment according to an embodiment of the present invention includes: a transmitting and receiving circuitry configured to, in a UE-requested Packet Data Network (PDU) session establishment procedure, transmit a PDU session establishment request message to a control device, and receive a PDU session establishment reject message from the control device; and a controller, in which the User Equipment initiates the UE-requested PDU session establishment procedure to establish a PDU session for a Local Area Data Network (LADN), in a case that the User Equipment is located outside an LADN service area, a 5GS Session Management (5GSM) cause value is included in the PDU session establishment reject message by the control device, and in a case that the 5GSM cause value is a 5GSM cause value indicating that the User Equipment is outside the LADN service area, the controller recognizes that the LADN provided by the User Equipment in the UE-requested PDU session establishment procedure is invalid, and the transmitting and receiving circuitry initiates a registration procedure, and in a case that LADN information is received in the registration procedure, the LADN information is stored.

A control device according to an embodiment of the present invention includes: a transmitting and receiving circuitry configured to, in a UE-requested Packet Data Network (PDU) session establishment procedure, receive a PDU session establishment request message from User Equipment, and transmit a PDU session establishment reject message to the User Equipment, in which the control device performs the UE-requested PDU session establishment procedure to establish a PDU session for a Local Area Data Network (LADN), in a case that the User Equipment is located outside the LADN service area, the control device includes a 5GS Session Management (5GSM) cause value in the PDU session establishment reject message, and in a case that the 5GSM cause value is a 5GSM cause value indicating that the User Equipment is outside the LADN service area, the control device performs a registration procedure for mobility and registration update to provide new LADN information to the User Equipment after the UE-requested PDU session establishment procedure is completed.

A communication control method for User Equipment according to an embodiment of the present invention includes, in a UE-requested Packet Data Network (PDU) session establishment procedure: transmitting a PDU session establishment request message to a control device; and receiving a PDU session establishment reject message from the control device, in which the User Equipment initiates the UE-requested PDU session establishment procedure to establish a PDU session for a Local Area Data Network (LADN), in a case that the User Equipment is located outside an LADN service area, a 5GS Session Management (5GSM) cause value is included in the PDU session establishment reject message by the control device, and in a case that the 5GSM cause value is a 5GSM cause value indicating that the User Equipment is outside the LADN service area, the User Equipment recognizes that the LADN provided by the User Equipment in the PDU session establishment procedure is invalid, and the User Equipment initiates a registration procedure, and in a case that LADN information is received in the registration procedure, the LADN information is stored.

A communication control method for a control device according to an embodiment of the present invention includes, in a UE-requested Packet Data Network (PDU) session establishment procedure: receiving a PDU session establishment request message from User Equipment; and transmitting a PDU session establishment reject message to the User Equipment, in which the control device performs the UE-requested PDU session establishment procedure to establish a PDU session for a Local Area Data Network (LADN), in a case that the User Equipment is located outside a LADN service area, the control device includes a 5GS Session Management (5GSM) cause value in the PDU session establishment reject message, and in a case that 5GSM cause value is a 5GSM cause value indicating that the User Equipment is outside the LADN service area, the control device performs a registration procedure for mobility and registration update to provide new LADN information to the User Equipment after the UE-requested PDU session establishment procedure is completed.

Advantageous Effects of Invention

According to one aspect of the invention, it is possible to realize error processing of a control device of a core network and error processing of user equipment in a case that connectivity to an LADN cannot be provided in a 5GS.

DESCRIPTION OF EMBODIMENTS

Preferred embodiments to perform the present invention will be described with reference to the drawings.

1. Overview of System

Figure 1:
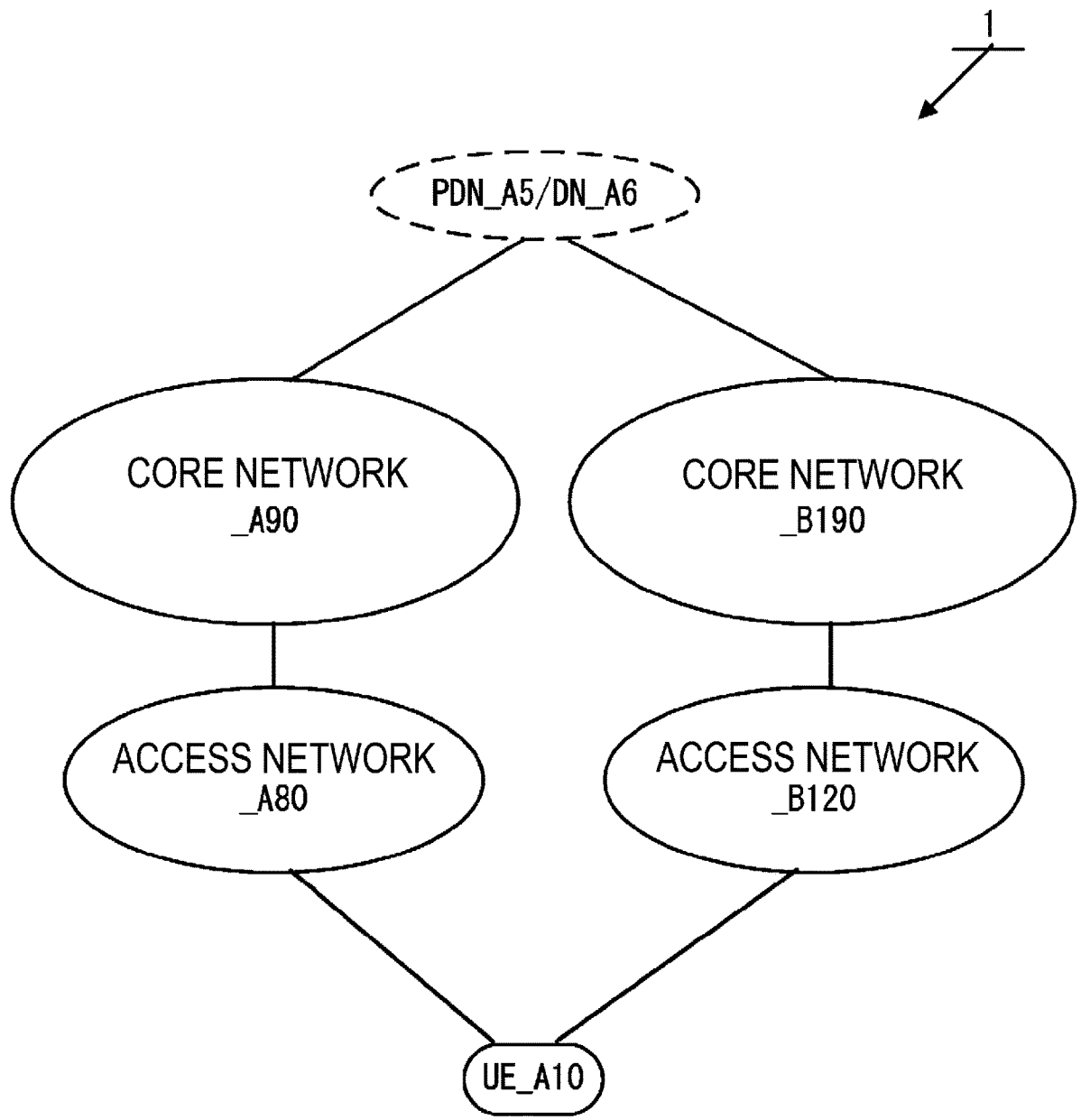
FIG. 1 is a diagram for explaining an overview of a mobile communication system (EPS/5GS).
Figure 2:
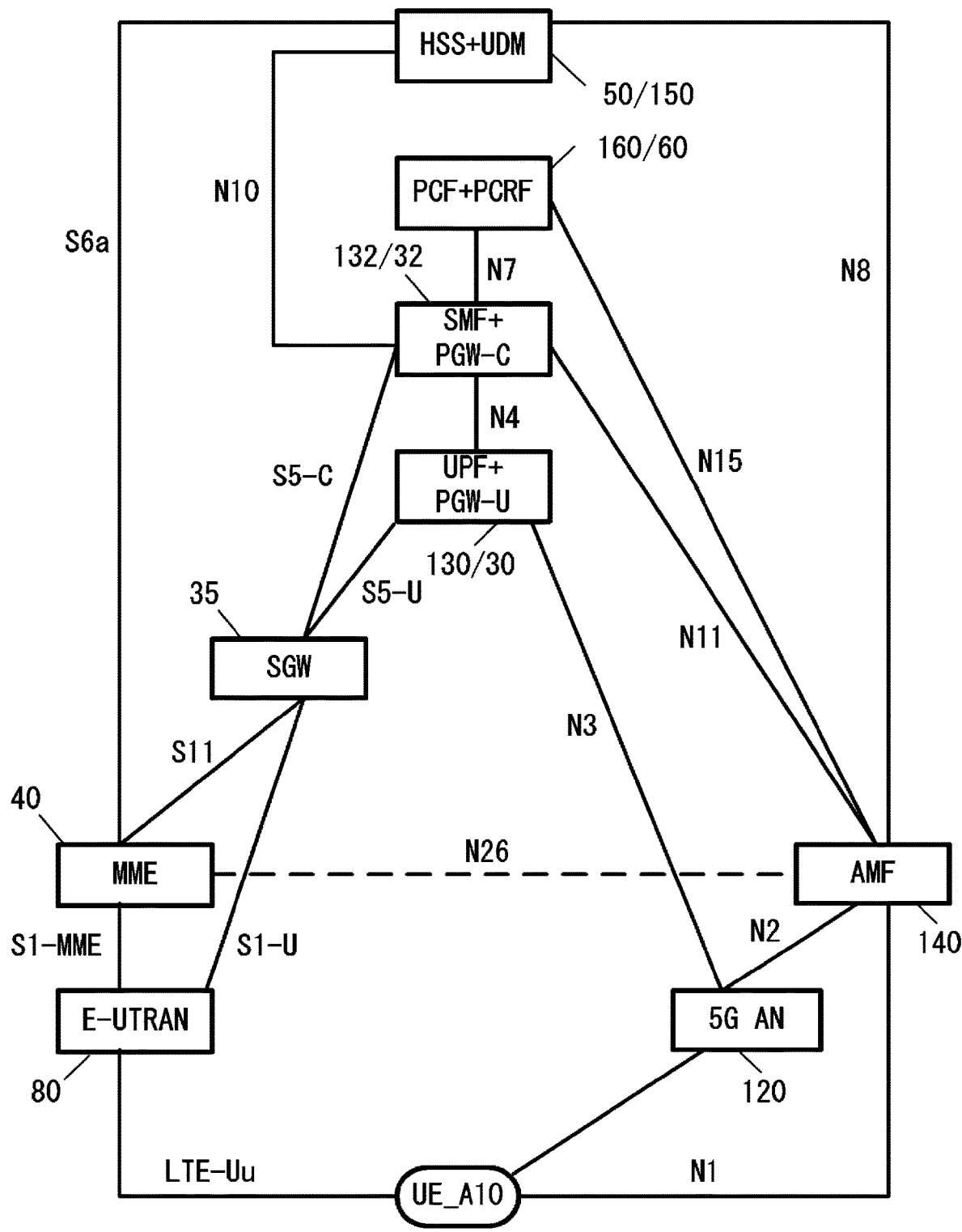
FIG. 2 is a diagram for explaining a detailed configuration of the mobile communication system (EPS/5GS).

First, FIG. 1 is a diagram for explaining an overview of a mobile communication system 1 used in each embodiment, and FIG. 2 is a diagram for explaining a detailed configuration of the mobile communication system 1.

FIG. 1 illustrates that the mobile communication system 1 includes UE_A10, an access network_A80, a core network_A90, a Packet Data Network (PDN)_A5, an access network_B120, a core network_B190, and a Data Network (DN)_A6.

In the following description, these devices and functions may be described with symbols omitted like UE, an access network_A, a core network_A, a PDN, an access network_B, a core network_B, and a DN.

Also, FIG. 2 illustrates devices and functions such as UE_A10, an E-UTRAN 80, an MME 40, an SGW 35, a PGW-U 30, a PGW-C32, a PCRF 60, an HSS 50, a 5G AN 120, an AMF 140, a UPF 130, an SMF 132, a PCF 160, and a UDM 150 and interfaces that connect these devices and functions to each other.

In the following description, these devices and functions may be described with symbols omitted like UE, an E-UTRAN, an MME, an SGW, a PGW-U, a PGW-C, a PCRF, an HSS, a 5G AN, an AMF, a UPF, an SMF, a PCF, and a UDM.

Note that although Evolved Packet System (EPS) that is a 4G system is configured to include an access network_A and a core network_A, EPS may further include UE and/or an PDN. Also, although a 5GS that is a 5G system is configured to include UE, an access network_B and a core network_B, the 5GS may further include a DN.

The UE is a device that can be connected to a network service via a 3GPP access (also referred to as a 3GPP access network or 3GPP AN) and/or a non-3GPP access (also referred to as a non-3GPP access network or a non-3GPP AN). The UE may be a terminal apparatus capable of performing wireless communication such as a mobile phone or a smartphone and may be a terminal apparatus that can be connected to EPS and a 5GS as well. The UE may include a Universal Integrated Circuit Card (UICC) and an Embedded UICC (eUICC). Note that the UE may be expressed as user equipment or may be expressed as a terminal apparatus.

Also, the access network_A corresponds to an Evolved Universal Terrestrial Radio Access Network (E-UTRAN) and/or a wireless LAN access network. One or more evolved Nodes B (eNBs) 45 are deployed in the E-UTRAN. Note that in the following description, eNB 45 may be written with the symbol omitted like an eNB. Moreover, in a case that there are a plurality of eNBs, each eNB is connected to the others with an X2 interface, for example. Further, one or more access points are deployed in the wireless LAN access network.

The access network_B corresponds to a 5G access network (5G AN). The 5G AN is configured with an NG Radio Access Network (NG-RAN) and/or a non-3GPP access network. One or more NR NodeBs (gNBs) 122 are deployed in the NG-RAN. Note that in the following description, gNB 122 may be written with the symbol omitted like an eNB. A gNB is a node that provides a New Radio (NR) user plane and a control plane and a node that is connected to a 5GCN via an NG interface (including an N2 interface or an N3 interface). In other words, a gNB is a base station apparatus newly designed for the 5GS and has a function that is different from that of a base station apparatus (eNB) used in EPS which is a 4G system. Also, in a case that there are a plurality of gNBs, each gNB is connected to the others with an Xn interface, for example.

In the following description, the E-UTRAN and the NG-RAN may be referred to as a 3GPP access Moreover, the wireless LAN access network and the non-3GPP AN may be referred to as a non-3GPP access. Also, nodes deployed in the access network_B may also collectively be referred to as NG-RAN nodes.

In the following description, the access network_A, and/or the access network_B, and/or devices included in the access network_A, and/or devices included in the access network_B may be referred to as access networks or access network devices.

Note that the core network_A corresponds to an Evolved Packet Core (EPC). In the EPC, a Mobility Management Entity (MME), a Serving Gateway (SGW), a Packet Data Network Gateway (PGW)-U, a PGW-C, a Policy and Charging Rules Function (PCRF), and a Home Subscriber Server (HSS), for example, are deployed.

Also, the core network_B corresponds to a 5G Core Network (5GCN). In the 5GCN, an Access and Mobility Management Function (AMF), a User Plane Function (UPF), a Session Management Function (SMF), a Policy Control Function (PCF), and a Unified Data Management (UDM), for example, are deployed in the 5GCN. Here, the 5GCN may be expressed as 5GC.

Hereinafter, the core network_A, and/or the core network_B, the devices included in the core network_A, and/or the devices included in the core network_B may be referred to as core networks or core network devices.

The core networks (the core network_A and/or the core network_B) may be IP mobile communication networks run by a Mobile Network Operator (MNO) connecting the access networks (the access network_A and/or the access network_B), the PDN, and/or the DN, may be core networks for a mobile network operator that runs and manages the mobile communication system 1, or may be a core network for a virtual mobile network operator or a virtual mobile network service provider such as a Mobile Virtual Network Operator (MVNO) or a Mobile Virtual Network Enabler (MVNE).

Although FIG. 1 illustrates a case that the PDN and the DN are the same, the PDN and the DN may be different from each other. Furthermore, the PDN may be a Data Network (DN) that provides a communication service to the UE. Note that the DN may be configured as a packet data service network or may be configured for each service. Furthermore, the PDN may include a connected communication terminal. Therefore, connecting with the PDN may be connecting with a communication terminal or a server device deployed in the PDN. Furthermore, the transmission and/or reception of user data to and/or from the PDN may be transmission and/or reception of the user data to and/or from the communication terminal or the server device deployed in the PDN. Note that the PDN may be represented as a DN and the DN may be represented as a PDN.

In the following description, the access network_A, the core network_A, the PDN, the access network_B, the core network_B, at least a part of the DN, and/or one or more devices included these may be referred to as networks or network devices. In other words, transmission and reception of messages from and to the networks and/or the network devices and/or performing of procedures by the networks and/or the network devices means that the access network_A, the core network_A, the PDN, the access network_B, the core network_B, at least a part of the DN, and/or one or more devices included in these transmit or receive messages and/or perform procedures.

Moreover, the UE can be connected to an access network. Also, the UE can be connected to the core network via the access network. Further, the UE can be connected to the PDN or the DN via the access network and the core network. In other words, the UE can transmit and receive (communicate) user data to and from the PDN or the DN. In a case that the user data is transmitted or received, not only an Internet Protocol (IP) but also non-IP communication may be used.

Here, the IP communication means data communication using an IP, and data is transmitted and received using an IP packet. The IP packet is configured with an IP header and a payload part. The payload part may include data to be transmitted or received by the devices or the functions included in the EPS and the devices or the functions included in the 5GS. The non-IP communication is data communication not using the IP, in which data is transmitted and received in a form different from the structure of the IP packet. For example, the non-IP communication may be data communication realized by transmission and reception of application data with no IP header applied thereto, or user data transmitted or received by the UE with another header such as a Mac header or an Ethernet (registered trademark) frame header applied thereto may be transmitted or received.

2. Configuration of Each Device

Next, a configuration of each device (the UE, and/or the access network device, and/or the core network device) used in each embodiment will be described using the drawings. Note that each device may be configured as physical hardware, may be configured as logical (virtual) hardware configured on general-purpose hardware, or may be configured as software. Also, at least some (including all) of functions that each device has may be configured as physical hardware, logical hardware, or software.

Note that each of storage units (a storage unit_A340, a storage unit_A440, a storage unit_B540, a storage unit_A640, and a storage unit_B740) in the devices and functions that will appear below are configured, for example, with a semiconductor memory, a Solid State Drive (SSD), or a Hard Disk Drive (HDD). Moreover, each storage unit can store not only information configured in advance in a shipping stage but also various kinds of information transmitted and received to and from devices and functions other than the own device and functions (for example, the UE, and/or the access network device, and/or the core network device, and/or the PDN, and/or the DN). Also, each storage unit can store identification information, control information, flags, parameters, and the like included in a control message transmitted and received during various communication procedures, which will be described later. Also, each storage unit may store such information for each UE. In a case that an inter-work between the 5GS and the EPS is performed, each storage unit can store a control message or user data transmitted and received to and from the devices and the functions included in the 5GS and/or the EPS. At this time, not only a control message and user data transmitted and received via an N26 interface but also a control message and user data transmitted and received without intervention of the N26 interface can also be stored therein.

2.1. Device Configuration of UE

Figure 3:
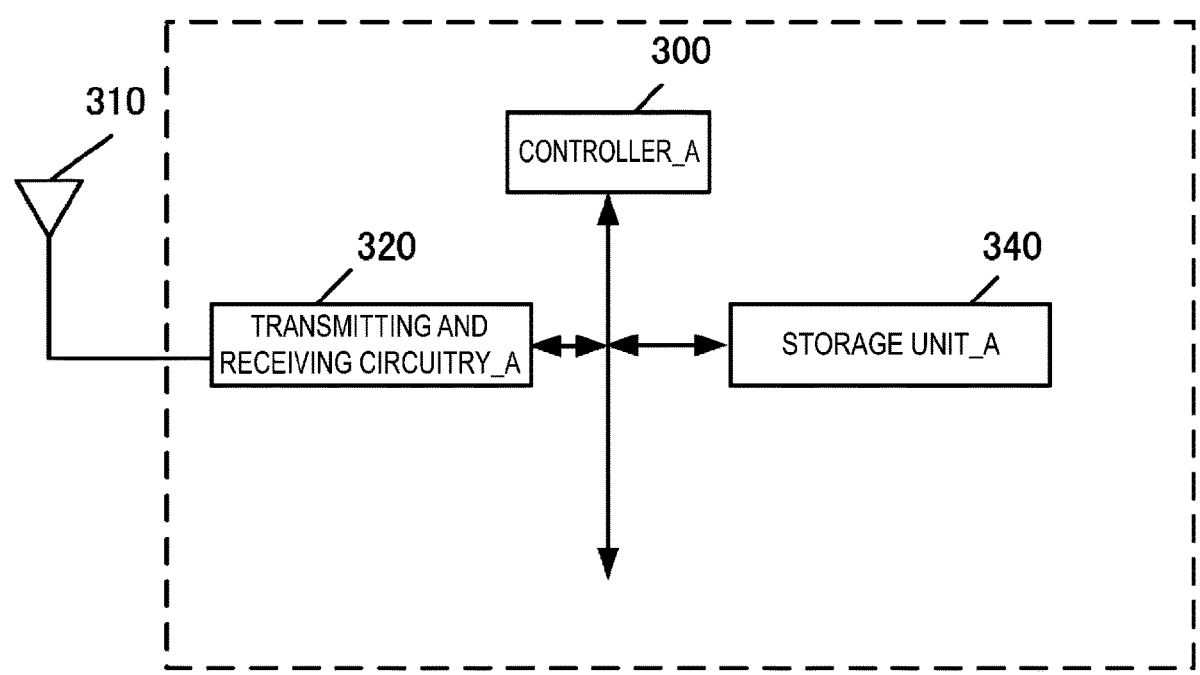
FIG. 3 is a diagram for explaining a device configuration of UE.

First, an example of a device configuration of the User Equipment (UE) will be described using FIG. 3. The UE is configured with a controller_A300, an antenna 310, a transmitting and receiving circuitry_A320, and a storage unit_A340. The controller_A300, the transmitting and receiving circuitry_A320, and the storage unit_A340 are connected to each other via a bus. The transmitting and receiving circuitry_A320 is connected to the antenna 310.

The controller_A300 is a functional unit that controls operations and functions of the entire UE. The controller_A300 realizes various kinds of processing in the UE by reading and performing various programs stored in the storage unit_A340.

The transmitting and receiving circuitry_A320 is a functional unit that performs wireless communication with a base station apparatus (eNB or gNB) in an access network via an antenna. In other words, the UE can transmit and receive user data and/or control information to and from the access network device, and/or the core network device, and/or the PDN, and/or the DN using the transmitting and receiving circuitry_A320.

As described in detail with reference to FIG. 2, the UE can communicate with the base station apparatus (eNB) in the E-UTRAN via an LTE-Uu interface using the transmitting and receiving circuitry_A320. Also, the UE can communicate with the base station apparatus (gNB) in the 5GAN using the transmitting and receiving circuitry_A320. In addition, the UE can transmit and receive AMF and a Non-Access-Stratum (NAS) messages via an N1 interface using the transmitting and receiving circuitry_A320. However, because the N1 is a logical interface, communication between the UE and the AMF is performed via a 5G AN in practice.

The storage unit_A340 is a functional unit for storing programs, user data, control information, and the like needed for each operation of the UE.

2.2. Device Configuration of gNB

Figure 4:
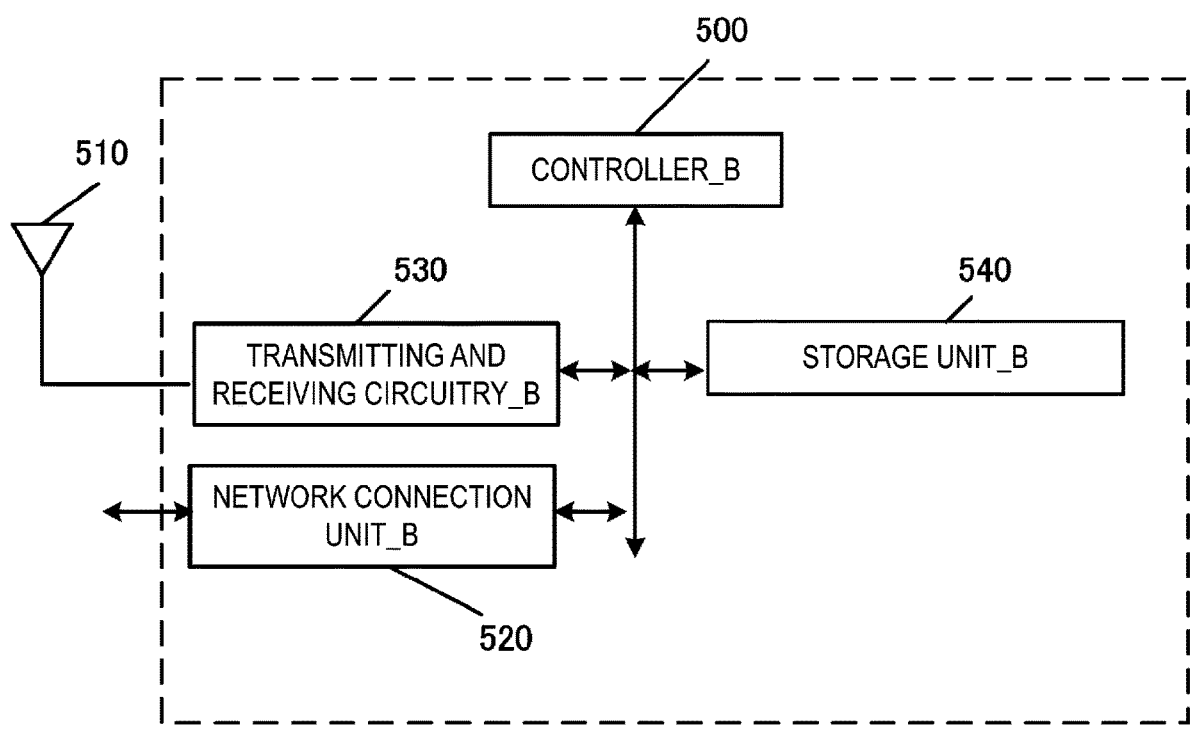
FIG. 4 is a diagram for explaining a configuration of an access network device (gNB) in a 5GS.

Next, an example of a device configuration of the gNB will be described using FIG. 4. The gNB is configured with a controller_B500, an antenna 510, a network connection unit_B520, a transmitting and receiving circuitry_B530, and the storage unit B540. The controller_B500, the network connection unit_B520, a transmitting and receiving circuitry_B530, and a storage unit_B540 are connected to each other via a bus. The transmitting and receiving circuitry_B530 is connected to the antenna 510.

The controller_B500 is a functional unit that controls operations and functions of the entire gNB. The controller_B500 realizes various kinds of processing in the gNB by reading and performing various programs stored in the storage unit_B540 as needed.

The network connection unit_B520 is a functional unit for the gNB to communicate with the AMF and/or the UPF. In other words, the gNB can transmit and receive user data and/or control information to and from the AMF and/or the UPF using the network connection unit_B520.

The transmitting and receiving circuitry_B530 is a functional unit for wireless communication with the UE via the antenna 510. In other words, the gNB can transmit and receive user data and/or control information to and from the UE using the transmitting and receiving circuitry_B530.

Detailed description will be given with reference to FIG. 2. The gNB in the 5G AN can communicate with the AMF via an N2 interface and can communicate with the UPF via an N3 interface using the network connection unit_B520. The gNB can communicate with the UE using the transmitting and receiving circuitry_B530.

The storage unit_B540 is a functional unit for storing programs, user data, control information, and the like needed for each operation of the gNB.

2.3. Device Configuration of AMF

Figure 5:
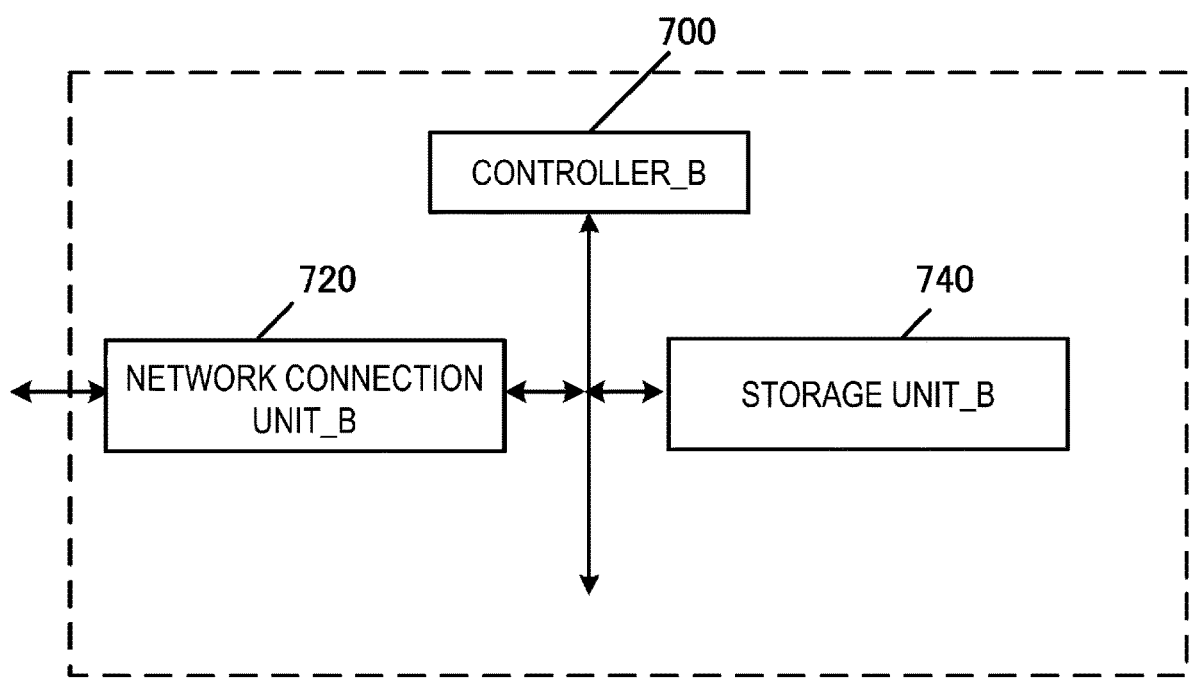
FIG. 5 is a diagram for explaining a configuration of a core network device (AMF/SMF/UPF) in the 5GS.

Next, an example of a device configuration of the AMF will be described using FIG. 5. The AMF is configured with a controller_B700, a network connection unit_B720, and a storage unit_B740. The controller_B700, the network connection unit_B720, and a storage unit_B740 are connected to each other via a bus. The AMF may be a node that handles a control plane.

The controller_B700 is a functional unit that controls operations or functions of the entire AMF. The controller_B700 realizes various kinds of processing in the AMF by reading and performing various programs stored in the storage unit_B740 as needed.

The network connection unit_B720 is a functional unit for the AMF to be connected to the base station apparatus (gNB), and/or the SMF, and/or the PCF, and/or the UDM, and/or the SCEF in the 5G AN. In other words, the AMF can transmit and receive user data and/or control information to and from the base station apparatus (gNB), and/or the SMF, and/or the PCF, and/or the UDM, and/or the SCEF in the 5G AN using the network connection unit_B720.

Detailed description will be given with reference to FIG. 2. The AMF in the 5GCN can communicate with the gNB via the N2 interface, can communicate with the UDM via the N8 interface, can communicate with the SMF via the N11 interface, and can communicate with the PCF via the N15 interface using the network connection unit_A620. Also, the AMF can transmit and receive an NAS message to and from the UE via the N1 interface using the network connection unit_A620. However, because the N1 is a logical interface, communication between the UE and the AMF is performed via a 5G AN in practice. Also, in a case that the N26 interface is supported, the AMF can communicate with the MME via the N26 interface using the network connection unit_A620.

The storage unit_B740 is a functional unit for storing programs, user data, control information, and the like needed for each operation of the AMF.

Note that the AMF has a functionality of exchanging a control message with a RAN using the N2 interface, a functionality of exchanging an NAS message with the UE using the N1 interface, a functionality performing encryption and integrity protection of the NAS message, a Registration Management (RM) functionality, a Connection Management (CM) functionality, a reachability management functionality, a mobility management functionality of the UE and the like, a functionality of transferring a Session Management (SM) message between the UE and the SMF, an access authentication (or access authorization) functionality, a security anchor (SEA) functionality, a Security Context Management (SCM) functionality, a functionality supporting the N2 interface for a Non-3GPP Interworking Function (N31WF), a functionality supporting transmission and reception of the NAS signal to and from the UE via the N31WF, a functionality of authenticating the UE connected via the N31WF, and the like.

In the registration management, an RM state for each UE is managed. The RM state may be synchronized between the UE and the AMF. The RM state includes a non-registered state (RM-DEREGISTERED state) and a registered state (RM-REGISTERED state). The RM-DEREGISTERED state is a state in which the AMF cannot reach the UE because the UE is not registered in the network and UE context in the AMF thus does not have effective position information and routing information for the UE. In the RM-REGISTERED state, the UE is registered in the network, and the UE can thus receive services that require registration with the network. Note that the RM state may be expressed as a 5GMM state. In this case, the RM-DEREGISTERED state may be expressed as a 5GMM-DEREGISTERED state, and the RM-REGISTERED state may be expressed as a 5GMM-REGISTERED state.

In other words, 5GMM-REGISTERED may be a state in which each device has established 5GMM context or may be a state in which each device has established PDU session context. Note that in a case that each device is in 5GMM-REGISTERED, the UE_A10 may start transmission and reception of user data and a control message and may respond to paging. Note that in a case that each device is in 5GMM-REGISTERED, the UE_A10 may perform a registration procedure other than a registration procedure for initial registration and/or a service request procedure.

Further, 5GMM-DEREGISTERED may be a state in which each device has not established 5GMM context, a state in which position information of the UE_A10 has not been recognized by the network, or a state in which the network cannot reach the UE_A10. Note that in a case that each device is in 5GMM-DEREGISTERED, the UE_A10 may initiate the registration procedure or may establish 5GMM context by performing the registration procedure.

In connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state but does not have NAS signaling connection established between the AMF and the UE via the N1 interface. Also, in the CM-IDLE state, the UE does not have an N2 interface connection (N2 connection) and an N3 interface connection (N3 connection). On the other hand, in the CM-CONNECTED state, the UE has the NAS signaling connection established between the AMF and the UE via the N1 interface. Also, in the CM-CONNECTED state, the UE may have the N2 interface connection (N2 connection) and/or the N3 interface connection (N3 connection).

Further, a CM state in a 3GPP access and a CM state in a non-3GPP access may be separately managed in the connection management. In this case, the CM state in the 3GPP access may include a non-connected state (CM-IDLE state over 3GPP access) in the 3GPP access and a connected state (CM-CONNECTED state over 3GPP access) in the 3GPP access. Further, the CM state in the non-3GPP access may include a non-connected state (CM-IDLE state over non-3GPP access) in the non-3GPP access and a connected state (CM-CONNECTED state over non-3GPP access) in the non-3GPP access. Note that the non-connected state may be expressed as an idle mode, and the connected state mode may be expressed as a connected mode.

Note that the CM state may be expressed as a 5GMM mode. In this case, the non-connected state may be expressed as a 5GMM non-connected mode (5GMM-IDLE mode), and the connected state may be expressed as a 5GMM connected mode (5GMM-CONNECTED mode). Further, the non-connected state in the 3GPP access may be expressed as a 5GMM non-connected mode (5GMM-IDLE mode over 3GPP access) in the 3GPP access, and the connected state in the 3GPP access may be expressed as a 5GMM connected mode (5GMM-CONNECTED mode over 3GPP access) in the 3GPP access. Further, the non-connected state in the non-3GPP access may be expressed as a 5GMM non-connected mode (5GMM-IDLE mode over non-3GPP access) in the non-3GPP access, and the connected state in the non-3GPP access may be expressed as a 5GMM connected mode (5GMM-CONNECTED mode over non-3GPP access) in the non-3GPP access. Note that the 5GMM non-connected mode may be expressed as an idle mode, and the 5GMM connected mode may be expressed as a connected mode.

In addition, one or more AMFs may be deployed in the core network_B. In addition, the AMF may be an NF that manages one or more Network Slice Instances (NSIs). In addition, the AMF may also be a Common Control Plane Network Function (Common CP Function, Common CPNF, or CCNF) shared among a plurality of NSIs.

Note that the N3IWF is a device and/or a function deployed between the non-3GPP access and the 5GCN in a case that the UE is connected to the 5GS via the non-3GPP access.

2.4. Device Configuration of SMF

Next, an example of a device configuration of the SMF will be described using FIG. 5. The SMF is configured with a controller_B700, a network connection unit_B720, and a storage unit_B740. The controller_B700, the network connection unit_B720, and a storage unit_B740 are connected to each other via a bus. The SMF may be a node that handles a control plane.

The controller_B700 is a functional unit that controls operations and functions of the entire SMF. The controller_B700 realizes various kinds of processing in the SMF by reading and performing various programs stored in the storage unit_B740 as needed.

The network connection unit_B720 is a functional unit for the SMF to be connected to the AMF, and/or the UPF, and/or the PCF, and/or the UDM. In other words, the SMF can transmit and receive user data and/or control information to and from the AMF, and/or the UPF, and/or the PCF, and/or the UDM using the network connection unit_B720.

Detailed description will be given with reference to FIG. 2. The SMF in the 5GCN can communicate with the AMF via the N11 interface, can communicate with the UPF via the N4 interface, can communicate with the PCF via the N7 interface, and can communicate with the UDM via the N10 interface using the network connection unit_A620.

The storage unit_B740 is a functional unit for storing programs, user data, control information, and the like needed for each operation of the SMF.

The SMF has a Session Management functionality such as establishing, amending, and releasing of a PDU session, IP address allocation to the UE and a management functionality therefor, a functionality of selecting and controlling a UPF, a UPF configuring functionality for routing traffic to an appropriate destination (transmission destination), a functionality of transmitting and receiving an SM part of the NAS message, a functionality of providing a notification that downlink data has arrived (Downlink Data Notification), a functionality of providing SM information unique to an AN (for each AN) transmitted to the AN via the N2 interface through the AMF, a functionality of determining a Session and Service Continuity mode (SSC mode) for a session, a loaming functionality, and the like.

2.5. Device Configuration of UPF

Next, an example of a device configuration of the UPF will be described using FIG. 5. The UPF is configured with a controller_B700, a network connection unit_B720, and a storage unit_B740. The controller_B700, the network connection unit_B720, and a storage unit_B740 are connected to each other via a bus. The UPF may be a node that handles a control plane.

The controller_B700 is a functional unit that controls operations and functions of the entire UPF. The controller_B700 realizes various kinds of processing in the UPF by reading and performing various programs stored in the storage unit_B740 as needed.

The network connection unit_B720 is a functional unit for the UPF to be connected to the base station apparatus(gNB), and/or the SMF, and/or the DN in the 5G AN. In other words, the UPF can transmit and receive user data and/or control information to and from the base station apparatus (gNB), and/or the SMF, and/or the DN in the 5G AN using the network connection unit_B720.

Detailed description will be given with reference to FIG. 2. The UPF in the 5GCN can communicate with the gNB via the N3 interface, can communicate with the SMF via the N4 interface, can communicate with the DN via the N6 interface, and can communicate with another UPF via the N9 interface using the network connection unit_A620.

The storage unit_B740 is a functional unit for storing programs, user data, control information, and the like needed for each operation of the UPF.

The UPF has a functionality as an anchor point for intra-RAT mobility or inter-RAT mobility, a functionality as an external PDU session point for mutual connection to the DN (that is, a functionality of serving as a gateway between the DN and the core network_B to transfer user data), a functionality of routing and transferring a packet, a Uplink Classifier (UL CL) functionality supporting routing of a plurality of traffic flows for one DN, a branching point functionality supporting multi-homed PDU session, a Quality of Service (QoS) processing for a user plane, a functionality of verifying uplink traffic, buffering of a downlink packet, a functionality of triggering a downlink data notification, and the like.

Note that the UPF may be a gateway for IP communication and/or non-IP communication. Also, the UPF may have a function of transferring IP communication and may have a function of achieving conversion between non-IP communication and IP communication. Further, a plurality of deployed gateways may serve as gateways for connecting the core network_B with a single DN. Note that the UPF may have connectivity with another NF or may be connected to each device via another NF.

Note that the user plane is user data transmitted and received between the UE and the network. The user plane may be transmitted and received using PDN connection or a PDU session. Further, in a case of the EPS, the user plane may be transmitted or received using an LTE-Uu interface, and/or an S1-U interface, and/or an S5 interface, and/or an S8 interface, and/or an SGi interface. Further, in a case of the 5GS, the user plane may be transmitted or received using an interface between the UE and the NG RAN, and/or the N3 interface, and/or the N9 interface, and/or the N6 interface. Hereinafter, the user plane may be expressed as a U-Plane.

Further, the control plane means a control message transmitted and received to perform communication control and the like for the UE. The control plane may be transmitted and received using Non-Access-Stratum (NAS) signaling connection between the UE and the MME. Further, in a case of the EPS, the control plane is transmitted and received using an LTE-Uu interface and an S1-MME interface. Further, in a case of the 5GS, the control plane may be transmitted and received using the interface between the UE and the NG RAN and the N2 interface. Hereinafter, the control plane may be expressed as a control plane or a C-plane.

Further, the User Plane (U-Plane or UP) may be a communication path for transmitting and receiving user data and may be configured with a plurality of bearers. Furthermore, the Control Plane (C-Plane or CP) may be a communication path for transmitting and receiving a control message and may be configured with a plurality of bearers.

2.6. Description of Other Devices and/or Functions

Next, other devices and/or functions will be described.

The PCF has a function and the like of providing a policy rule.

Also, the UDM has an authentication credential processing function, a user identification processing function, an access authentication function, a registration/mobility management function, a subscriber information management (subscription management) function, and the like.

The PCRF is connected to the PGW and/or the PDN and has a function and the like of performing QoS management regarding data distribution. For example, QoS of the communication path between the UE_A10 and the PDN is managed. Furthermore, the PCRF may be a device to create and/or manage a Policy and Charging Control (PCC) rule and/or a routing rule used by each device for transmitting and receiving user data.

Also, the HSS is connected to the MME and/or the SCEF and has a function and the like of managing subscriber information. The subscriber information in the HSS is referred to during access control of the MME, for example. Moreover, the HSS may be connected to a location management device different from the MME.

Also, the SCEF is connected to the DN and/or the PDN and the MME, and the HSS and has a function and the like of a relay device that serves as a gateway connecting the DN and/or the PDN and the core network_A to transfer user data. Note that the SCEF may serve as a gateway for non-IP communication. Further, the SCEF may have a function to perform conversion between non-IP communication and IP communication. Also, a plurality of such gateways may be deployed in the core network_A. Note that the SCEF may be configured outside the core network or may be configured inside the core network.

3. Description of Terminology, Identification Information, and Procedures Used in Each Embodiment Terminology, identification information, and procedures, at least one of which is used in each embodiment, will be described in advance.

3.1. Description of Terminology and Identification Information Used in Each Embodiment First, highly specialized terminology and identification information used in procedures which are used in each embodiment will be described in advance.

A network indicates at least some of the access network_B, the core network_B, and the DN. One or more devices included in at least some of the access network_B, the core network_B, and the DN may be referred to as networks or network devices. In other words, a network transmitting and receiving a message and/or performing processing may mean that a device (a network device and/or a control device) in the network transmits and receives the message and/or performs the processing. On the contrary, the device in the network transmitting and receiving a message and/or performing processing may mean that the network transmits and receives the message and/or performs the processing.

Also, a Session Management (SM) message (also referred to as a Non-Access-Stratum (NAS) SM message) may be an NAS message used in a procedure for the SM and may be a control message transmitted and received between the UE_A10 and the SMF_A230 via the AMF_A240. Furthermore, the SM message may include a PDU session establishment request message, a PDU session establishment accept message, a PDU session complete message, a PDU session reject message, a PDU session modification request message, a PDU session modification accept message, a PDU session modification response message, and the like. In the procedure for the SM, a PDU session establishment procedure may be included.

Also, a 5G System (5GS) service may be a connection service provided using the core network_B190. Further, the 5GS service may be a service different from the EPS service or may be a service similar to the EPS service.

Also, a non 5GS service may be a service other than the 5GS service and may include an EPS service and/or a non EPS service.

In addition, a single registration mode is a mode in which a common registration mode is maintained for both the 5GMM state and the EMM state in a case that the UE_A10 can use an N1 mode and an S1 mode.

Also, a dual registration mode is a mode in which a registration mode is maintained independently for the 5GMM state and for the EMM state in a case that the UE_A10 can use the N1 mode and the S1 mode. Note that in the case of the dual registration mode, the UE_A10 may be registered in the network only in the N1 mode (that is, registered only in the 5GC), may be registered in the network only in the S1 mode (that is, registered only in the EPC), or may be registered in the network both in the N1 mode and in the S1 mode (registered both in the 5GC and in the EPC).

Also, UE that supports both the 5GC and the EPC NAS for interworking between the 5GS and the EPC can operate in the single registration mode or the dual registration mode.

Also, the S1 mode is a mode in which the UE_A10 is allowed to access the EPC via the E-UTRAN. In other words, the S1 mode may be a mode in which transmission and reception of messages are performed using the S1 interface. Note that the S1 interface may be configured with an S1-MME interface and an S1-U interface.

Also, the N1 mode is a mode in which the UE_A10 is allowed to access the 5GC via the 5G access network. In other words, the N1 mode may be a mode in which transmission and reception of messages are performed using the N1 interface.

Also, an Access Point Name (APN) may be identification information for identifying an external network such as a core network and/or a PDN. Further, the APN can also be used as information for selecting a gateway, such as a PGW_A30/UPF_A235, to which the core network A_90 is connected.

Also, a Packet Data Network (PDN) type indicates a type of PDN connection and includes Ipv4, Ipv6, Ipv4v6, and non-IP. In a case that IPv4 is designated, this indicates that data is to be transmitted and received using IPv4. In a case that IPv6 is designated, this indicates that data is to be transmitted and received using IPv6. In a case that IPv4v6 is designated, this indicates that data is to be transmitted and received using IPv4 or IPv6. In a case that non-IP is designated, this indicates that communication is to be performed by a communication method other than an IP instead of communication using an IP.

Also, a Protocol Data Unit/Packet Data Unit (PDU) session can be defined as a relevance between the DN and the UE that provide a PDU connectivity service or may be connectivity established between the UE and the external gateway. In a 5GS, the UE can transmit and receive user data to and from the DN using the PDU session through establishment of a PDU session via the access network_B and the core network_B. Here, the external gateway may be a UPF, an SCEF, or the like. The UE can transmit and receive user data to and from a device such as an application server deployed in the DN using the PDU session.

Note that each device (the UE, and/or the access network device, and/or the core network device) may manage one or more pieces of identification information in a correlated manner for the PDU session. Note that such identification information may include one or more of a DNN, a QoS rule, a PDU session type, application identification information, NSI identification information, access network identification information, and SSC mode or may further include other information. Further, in a case that a plurality of PDU sessions are established, each piece of identification information correlated with the PDU session may be the same content or may be different content.

Also, a Data Network Name (DNN) may be identification information for identifying an external network such as a core network and/or a DN. Further, the DNN can also be used as information for selecting a gateway such as PGW_A30/UPF_A235 to which the core network B190 is connected. Furthermore, the DNN may correspond to an Access Point Name (APN).

A Protocol Data Unit/Packet Data Unit (PDU) session type indicates a type of the PDU session and includes Ipv4, Ipv6, Ethernet, and Unstructured. In a case that IPv4 is designated, this indicates that data is to be transmitted and received using IPv4. In a case that IPv6 is designated, this indicates that data is to be transmitted and received using IPv6. In a case that Ethernet is designated, this indicates that Ethernet frames are to be transmitted and received. Also, Ethernet may indicate that communication using an IP is not performed. In a case that Unstructured is designated, this means that data is to be transmitted and received to and from an application server in the DN using a Point-to-Point (P2P) tunneling technique. As the P2P tunneling technique, an UDP/IP encapsulation technique, for example, may be used. Note that the PDU session type may include an IP in addition to the aforementioned types. IP can be designated in a case that the UE can use both IPv4 and IPv6.

Also, a Network Slice (NS) is a logical network that provides specific network capabilities and network properties. The UE and/or the network can support the network slice (NW slice or NS) in the 5GS.

In addition, a Network Slice Instance (NSI) is configured with an instance (entity) of a network function (NF) and a set of required resources and forms a network slice to be deployed. Here, the NF is a processing function in the network and is employed or defined in the 3GPP. The NSI is an entity of one or more NSs configured in the core network_B. The NSI may be configured with a virtual Network Function (NF) generated using a Network Slice Template (NST). Here, the NST is associated with a resource request for providing a required communication service or capability and is a logical expression of one or more NFs. Specifically, the NSI may be an aggregation including a plurality of NFs in the core network_B 190. The NSI may be a logical network configured to classify the user data delivered through a service or the like. In the NS, one or more NFs may be configured. The NF configured in the NS may or may not be a device shared by another NS. The UE and/or a device in the network can be allocated to one or more NSs based on NSSAI, and/or S-NSSAI, and/or a UE usage type, and/or registration information such as one or more NSI IDs, and/or APN. Note that the UE usage type is a parameter value included in the registration information of the UE used to identify the NSI. The UE usage type may be stored in the HSS. The AMF may select the SMF and the UPF based on the UE usage type.

In addition, Single Network Slice Selection Assistance Information (S-NSSAI) is information for identifying the NS. The S-NSSAI may be configured only with a Slice/Service type (SST) or may be configured both with an SST and a Slice Differentiator (SD). Here, the SST is information indicating an operation of NS expected in terms of a function and a service. Also, the SD may be information to interpolate the SST in a case that one NSI is selected from a plurality of NSIs indicated by the SST. The S-NSSAI may be information unique to each PLMN or may be standard information shared by PLMNs. Also, the network may store one or more S-NSSAIs in the registration information of the UE as default S-NSSAI. Note that in a case that S-NSSAI is default S-NSSAI, and in a case that the UE does not transmit effective S-NSSAI in a registration request message to the network, the network may provide an NS related to the UE.

Moreover, Network Slice Selection Assistance Information (NSSAI) is a group of S-NSSAIs. Each S-NSSAI included in the NSSAI is information that assists the access network or the core network to select NSI. The UE may store NSSAI allowed by the network for each PLMN. The NSSAI may also be information used to select the AMF.

The Session and Service Continuity (SSC) mode indicates a mode of session and service continuity supported by a system and/or each device in the 5G system (5GS). More specifically, the SSC mode may be a mode indicating a type of session and service continuity supported by the PDU session established between the UE_A10 and the UPF. Note that the SSC mode may be a mode indicating a type of the session and service continuity configured for each PDU session. Further, the SSC mode may be configured with three modes, namely an SSC mode 1, an SSC mode 2, and an SSC mode 3. Note that the SSC mode correlated with the PDU session may not be changed in a case that the PDU session is present.

In addition, a 5GMM-CONNECTED mode with RRC inactive indication is a state indicating that a state of an NAS layer is in a connected state regardless of an RRC layer being in an inactive state. In other words, the 5GMM-CONNECTED mode with RRC inactive indication is a state in which a wireless bearer is released with context of NAS signaling connection and/or NAS signaling connection maintained.

Note that support of the 5GMM-CONNECTED mode with RRC inactive indication may mean that maintaining of a state of the NAS layer in a connected state is supported even in a case that a notification indicating that the RRC layer has become inactive is received from a lower layer. Further, utilization of 5GMM-CONNECTED mode with RRC inactive indication may indicate that a state of the NAS layer is maintained in the connected state even in a case that a notification indicating that the RRC layer has become inactive has been received from the lower layer.

A tracking area is a single or a plurality of ranges that can be represented by location information of the UE_A10 managed by the core network. The tracking area may be configured with a plurality of cells. Further, the tracking area may be a range in which a control message such as paging is broadcast or may be a range in which the UE_A10 can move without a handover procedure. Further, the tracking area may be a routing area, a location area, or an area similar to them. Hereinafter, the tracking area may be a Tracking Area (TA).

A TA list is a list including one or a plurality of TAs that the network has allocated to the UE-A10. Note that while the UE_A10 is moving within one or a plurality of TAs included in the TA list, the UE_A10 may be able to move without performing a tracking area update procedure. In other words, for the UE_A10, the TA list may be an information group indicating an area in which the UE_A10 can move without performing the tracking area update procedure. Note that the TA list may be expressed as a TAI list configured with one or a plurality of Tracking area identities (TAI), and in the following description, the TAI list may indicate the TA list.

The Local Area Data Network (LADN) is a DN to which the UE can be connected only at a specific location and provides connectivity to a specific DNN (that is, the LADN DNN). The LADN may be a DN to which connection can be made using a PDU session correlated with a specific DNN at a specific location. Further, the LADN may be a DN to which connection can be made using a PDU session correlated with a combination of a specific DNN and specific S-NSSAI at a specific location.

LADN information is information related to the LADN. The LADN information may be information indicating specific LADN that the UE can use. The LADN information may include LADN DNN and LADN service area information. More specifically, LADN information may include information (hereinafter, referred to as information indicating the LADN), that is present for each one or a plurality of LADNs. Further, the information indicating the LADN may include LADN DNN and LADN service area information. Here, the LADN DNN may be information for identifying the LADN, may be information for identifying the DN handled as the LADN, or may DNN used in a case that a PDU session is established for the LADN.

Note that in a case that the LADN information is conventional LADN information, the LADN information may be information of the aforementioned configuration. Specifically, in a case that the LADN information is conventional LADN information, a LADN service area may be a conventional LADN service area.

On the contrary, in a case that the LADN information is extended LADN information, the LADN information may be information with the aforementioned configuration partially extended. Specifically, in a case that the LADN information is extended LADN information, the LADN service area may be an extended LADN service area. Further, in a case that the LADN information is the extended LADN information, the information indicating the LADN may further include information indicating a period during which the LADN service area is valid and/or information indicating granularity of the LADN service area. Further, in the case that the LADN information is the extended LADN information, the information indicating the LADN may further include S-NSSAI.

The LADN service area is an area in which a PDU session for the LADN can be established. The LADN service area may be an area in which connection to the LADN can be made. Further, the LADN service area may be an area indicated by LADN service area information. Here, the LADN service area information may be information for identifying the LADN service area, and may be provided as a set of tracking areas, or may be provided as Tracking Area Identity (TAI) list.

Note that in a case that the LADN service area is a conventional LADN service area, the LADN service area may be an area configured with a tracking area that belongs to a registration area to which the UE is being currently connected. In other words, in a case that the LADN service area is a conventional LADN service area, the LADN service area may be an area configured with one or a plurality of tracking areas. On the contrary, in a case that the LADN service area is the extended LADN service area, the LADN service area may be an area configured with the tracking area or may be an area covered by some of base stations in the tracking area. Further, in the case that the LADN service area is the extended LADN service area, the LADN service area may be an area with a size other than the area configured with the tracking area or may be an area that does not depend on the tracking area. In other words, in the case that the LADN service area is the extended LADN service area, the LADN service area may be an area configured with one or a plurality of tracking areas or may be an area that is different from the area configured with one or a plurality of tracking areas.

Furthermore, in a case that the LADN service area is an area configured with one or a plurality of tracking areas, the LADN service area information may be a tracking area ID list configured with one or a plurality of tracking area IDs.

On the contrary, in a case that the LADN service area is an area that is different from the area configured with one or a plurality of tracking areas, the LADN service area information may be information that requires assistance of a Radio Access Network (RAN) or may be information that does not require assistance of the RAN. Here, the information that requires assistance of the RAN may be cell information or may be base station information. Further, the information that requires assistance of the RAN may be a cell ID or may be a base station ID. Further, the information that requires assistance of the RAN is not limited thereto and may be information defined by the RAN. Further, the information that does not require assistance of the RAN may be physical location information and may be location information that can be acquired by an application. Further, the information that does not require the assistance of the RAN is not limited thereto and may be information that can be acquired in a way other than the RAN. Here, the RAN may be expressed as an access network. On the contrary, the access network may be referred to as a RAN.

Extension of the LADN service area may mean utilization of an LADN service area with granularity different from that of the conventional LADN service area. Further, the extension of the LADN service area means utilization of extended LADN information that is different from the conventional LADN information. Further, the extension of the LADN service area means connection to the extended LADN that is different from the conventional LADN.

In other words, in a case that each device supports extension of the LADN service area, the extended LADN service area that is different from the conventional LADN service area can also be adapted in addition to the conventional LADN service area. Further, in a case that each device supports the extension of the LADN service area, extended LADN information that is different from the conventional LADN information may also be able to be used in addition to conventional LADN information. Further, in a case that each device supports the extension of the LADN service area, it is possible to connect to the extended LADN that is different from the conventional LADN in addition to the conventional LADN.

On the contrary, in a case that some of devices does not support the extension of the LADN service area, the extended LADN service area may not be able to be adapted while only the conventional LADN service area may be able to be adapted. Further, in a case that some of devices does not support the extension of the LADN service area, the LADN information may not be able to be used while only the conventional LADN information may be able to be used. Further, in a case that some of devices do not support the extension of the LADN service area, connection to the extended LADN may not be able to be made while only connection to the conventional LADN may be able to be made.

In a case that each device supports utilization restriction of the extension of the LADN service area, the extended LADN service area may not be able to be adapted while only the conventional LADN service area may be able to be adapted. Further, in a case that each device supports the utilization restriction of the extension of the LADN service area, the extended LADN information may not be able to be used while only the LADN information may be able to be used. Further, in a case that each device supports the utilization restriction of the extension of the LADN service area, connection to the extended LADN may not be able to be made while only connection to the conventional LADN may be able to be made.

On the contrary, in a case that each device does not support the utilization restriction of the extension of the LADN service area, the extended LADN service area may also be able to be adapted. Further, in a case that each device does not support the utilization restriction of the extension of the LADN service area, the extended LADN information may also be able to be used. Further, in a case that each device does not support the utilization restriction of the extension of the LADN service area, connection to the extended LADN may be able to be made.

A PDU session for LADN is a PDU session correlated with the DNN associated with the LADN. The PDU session for LADN may be a PDU session established for the LADN. In other words, the PDU session for the LADN may be a PDU session established between the UE and the LADN or may be a PDU session used in user data communication between the UE and the LADN. Note that the PDU session for the LADN may be a PDU session that can be established only in the LADN service area. In other words, the UE can establish the PDU session for the LADN using a specific DNN at a specific location. Further, in other words, the UE can establish the PDU session for the LADN using a combination between a specific DNN and specific S-NSSAI at a specific location.

First identification information is information indicating whether or not the UE supports the extension of the LADN service area. The first identification information may be a bit indicating that the extension of the LADN service area is supported or may be a bit indicating that the extension of the LADN service area is not supported.

Also, the first identification information may be information indicating whether or not the UE supports the utilization restriction of the extension of the LADN service area. Further, the first identification information may be a bit indicating that the utilization restriction of the extension of the LADN service area is supported or may be a bit indicating that the utilization restriction of the extension of the LADN service area is not supported.

Further, the first identification information may be a bit configuring a 5GMM capability information element indicating the capability of the UE in the 5G. Further, the first identification information may be information selected and determined based on capability information of the UE, and/or a configuration of the UE, and/or a state of the UE, and/or a user policy, and/or a request of an application.

Second identification information is an LADN indication. The second identification information is information indicating a request for LADN information. The second identification information may be information indicating whether or not to request the LADN information. Further, the second identification information may be information indicating a requested LADN DNN. Further, the second identification information may be information indicating a requested LADN serving area.

Further, the second identification information may be information indicating a request for update of the LADN information or may be information indicating the LADN information after update. Further, the second identification information may be information indicating a request for deletion of the LADN information.

Further, the second identification information may be a bit configuring a 5GMM capability information element indicating the capability of the UE in the 5G. Further, the second identification information may be information selected and determined based on capability information and the UE, and/or a configuration of the UE, and/or a state of the UE, and/or a user policy, and/or a request of an application.

Eleventh identification information is information indicating whether or not the network supports extension of the LADN service area. The eleventh identification information may be a bit indicating that the extension of the LADN service area is supported or may be a bit indicating that the extension of the LADN service area is not supported.

The eleventh identification information may be information indicating whether or not the network supports the utilization restriction of the extension of the LADN service area. Further, the eleventh identification information may be a bit indicating that the utilization restriction of the extension of the LADN service area is supported or may be a bit indicating that the utilization restriction of the extension of the LADN service area is not supported.

Further, the eleventh identification information may be a bit configuring a 5GS network feature support information element indicating the capability of the network in the 5G. Further, the eleventh identification information may be information selected and determined by the network based on received first identification information, and/or information correlated with the DN, and/or information correlated with the NSI, and/or capability information of the network, and/or an operator policy, and/or a state of the network, and/or user registration information, and/or the like. Further, the eleventh identification information may be information selected and determined based on other identification information selected by the network in the present procedure.

Twelfth identification information is LADN information. The twelfth identification information may be LADN information allowed by the network or may be valid LADN information. Further, the twelfth identification information may be information transmitted and received in a case that a LADN service area is present in a registration area to which the UE is connected.

Further, in a case that the first identification information and/or the eleventh identification information are information indicating that the extension of the LADN service area is supported, the twelfth identification information may be extended LADN information that is different from the conventional LADN information. On the contrary, in a case that the first identification information and/or the eleventh identification information are information indicating that the extension of the LADN service area is not supported, the twelfth identification information may be the conventional LADN information.

Also, in a case that the first identification information and/or the eleventh identification information are information indicating that the utilization restriction of the extension of the LADN service area is supported, the twelfth identification information may be conventional LADN information. On the contrary, in a case that the first identification information and/or the eleventh identification information is information indicating that the utilization restriction of the extension of the LADN service area is not supported, the twelfth identification information may be extended LADN information that is different from the conventional LADN information.

Further, the twelfth identification information may be information selected and determined by the network based on received identification information, and/or information correlated with the DN, and/or information correlated with the NSI, and/or capability information of the network, and/or an operator policy, and/or a state of the network, and/or user registration information, and/or the like. Further, the twelfth identification information may be information selected and determined based on other identification information selected by the network in the present procedure.

Thirteenth identification information is information indicating granularity of the LADN service area. The thirteenth identification information may be information indicating the size of the LADN service area. Further, the thirteenth identification information may be transmitted and received in correlation with the twelfth identification information or may be transmitted and received in correlation with information that is present for each LADN included in the twelfth identification information (hereinafter, referred to as information indicating the LADN). Further, the thirteenth identification information may be transmitted and received for each piece of information indicating the LADN. In this case, the thirteenth identification information may be different for each piece of information indicating the LADN or may be the same between pieces of information indicating a plurality of LADNs.

Note that in a case that the thirteenth identification information is transmitted and received in correlation with the information indicating the LADN, the thirteenth identification information may be information indicating granularity of the LADN service area information included in the information indicating the LADN (hereinafter, referred to as LADN service area information).

For example, the thirteenth identification information may be information indicating that an area configured with one or a plurality of tracking areas is used as the LADN service area. In this case, a tracking area ID list configured with one or a plurality of tracking area IDs may be configured in the LADN service area information.

Further, the thirteenth identification information may be information indicating that an area that is different from an area configured with one or a plurality of tracking areas is used as the LADN service area. In this case, information that requires assistance of the RAN may be configured, or information that does not require assistance of the RAN may be configured in the LADN service area information.

Further, the thirteenth identification information may be information indicating that an area covered by some of base stations in the tracking area is used as the LADN service area. In this case, a cell ID and/or a cell ID list configured with one or a plurality of cell IDs may be configured in the LADN service area information.

Further, the thirteenth identification information may be information indicating that an area configured without depending on the tracking area is used as the LADN service area. In this case, physical location information may be configured in the LADN service area information.

Here, in a case that the thirteenth identification information is not transmitted and received and/or the thirteenth identification information is invalid information, an area configured with one or a plurality of tracking areas may be used as the LADN service area. Further, a tracking area ID list configured with one or a plurality of tracking area IDs may be configured in the LADN service area information. Note that granularity and/or the LADN service area information indicated by the thirteenth identification information may not be limited thereto.

Further, thirteenth identification information may be information selected and determined by the network based on received first identification information, and/or information correlated with the DN, and/or information correlated with the NSI, and/or capability information of the network, and/or an operator policy, and/or a state of the network, and/or user registration information, and/or the like. Further, the thirteenth identification information may be information selected and determined based on other identification information selected by the network in the present procedure.

Fourteenth identification information is information indicating a period during which the LADN service area is valid. The fourteenth identification information may be information indicating whether or not the LADN service area is currently valid. Further, the fourteenth identification information may be transmitted and received in correlation with the twelfth identification information or may be transmitted and received in correlation with information that is present for each LADN included in the twelfth identification information (hereinafter, referred to as information indicating the LADN). Further, the fourteenth identification information may be transmitted and received for each piece of information indicating the LADN. In this case, the fourteenth identification information may be different for each piece of information indicating the LADN or may be the same between pieces of information indicating a plurality of LADNs.

Here, the information indicating the period during which the LADN service area is valid may be information indicating a time during which the LADN service area is valid or may be information indicating a period indicated by a specific date and time. Further, the information indicating the period during which the LADN service area is valid may be information indicating a specific time period or may be information indicating a specific day. Further, the information indicating the period during which the LADN service area is valid may be information indicating a specific date or may be information indicating a specific week. Further, the information indicating the period during which the LADN service area is valid may be information indicating a specific month or may be information indicating a specific year.

Here, in a case that the fourteenth identification information is not transmitted and received and/or the fourteenth identification information is invalid information, the period during which the LADN service area is valid may be a period until the LADN information and/or information indicating the LADN is updated. Note that the information indicating the period during which the LADN service area is valid may not be limited thereto.

Further, the fourteenth identification information may be information selected and determined by the network based on received first identification information, and/or information correlated with the DN, and/or information correlated with the NSI, and/or capability information of the network, and/or an operator policy, and/or a state of the network, and/or user registration information, and/or the like. Furthermore, the fourteenth identification information may be information selected and determined based on other identification information selected by the network in the present procedure.

Twenty sixth identification information is information indicating a DNN. The twenty sixth identification information may be information indicating the DNN requested by the UE. More specifically, the twenty sixth identification information may be information requested by the UE and indicating the DNN correlated with the PDU session established in the present procedure. Further, the twenty sixth identification information may be information selected and determined based on one or more pieces of identification information, and/or a configuration of the UE, and/or a state of the UE, and/or a user policy, and/or a request of an application out of the eleventh to seventeenth identification information transmitted and received.

Also, thirty sixth identification information is information indicating a DNN. The thirty sixth identification information may be information indicating the DNN selected by the network. More specifically, the thirty sixth identification information may be information selected by the network and indicating the DNN correlated with the PDU session established in the present procedure.

Further, the thirty sixth identification information may be information selected and determined by the network based on received thirty sixth identification information, and/or information correlated with the NSI, and/or capability information of the network, and/or an operator policy, and/or a state of the network, and/or user registration information, and/or the like. Further, the thirty sixth identification information may be information selected and determined based on other identification information selected by the network in the present procedure.

Further, forty first identification information is a cause value indicating a cause or reason why the request of the UE is not allowed. The forty first identification information may be a 5GS Session Management (5GSM) cause value. Further, the forty first identification information may be information indicating that the UE is located outside the LADN service area. Further, the forty first identification information may be information used by the network to indicate that the UE is located outside the LADN service area.

Further, the forty first identification information, the forty first identification information may be information indicating that the requested LADN is not allowed in the area to which the UE currently belongs. Note that the area to which the UE currently belongs may be an area configured with one or a plurality of tracking areas or may be a LADN service area correlated with the LADN DNN.

Further, the forty first identification information may be information selected and determined by the network based on identification information received from the UE, and/or capability information of the network, and/or an operator policy, and/or a state of the network, and/or user registration information, and/or the area to which the UE currently belongs, and/or the like.

Further, the forty first identification information may be a 5GS Mobility Management (5GMM) cause value. Further, the forty first identification information may be information used in a case in which the AMF cannot transfer, to the SMF, an SM message such as a PDU session establishment request message received from the UE.

3.2. Description of Procedures Used in Each Embodiment

Next, procedures used in each embodiment will be described. Note that the procedures used in each embodiment includes a registration procedure, a PDU session establishment procedure, and a generic UE configuration update procedure. Hereinafter, each procedure will be described.

Note that in each embodiment, a case that the HSS and the UDM, the PCF and the PCRF, the SMF and the PGW-C, and the UPF and the PGW-U are configured as same devices (that is, the same physical hardware, or the same logical hardware, or the same software) as illustrated in FIG. 2 will be described as an example. However, details described in the present embodiment can also be applied to a case that these are configured as different devices (that is, different physical hardware, or different logical hardware, or different software). For example, data may be transmitted and received directly among these, data may be transmitted and received via the N26 interface between the AMF and the MME, or data may be transmitted and received via the UE.

3.2.1 Registration Procedure

First, the registration procedure will be described using FIG. 6. The registration procedure is a procedure in the 5GS. Hereinafter, the present procedure indicates the registration procedure. The registration procedure is a procedure initiated by the UE to perform registration in the access network_B, and/or the core network_B, and/or the DN. In a state in which the UE has not been registered in the network, the UE can perform the present procedure at an arbitrary timing such as a timing when power is turned on, for example. In other words, the UE can initiate the present procedure at an arbitrary timing in a non-registered state (RM-DEREGISTERED state). In addition, each device (particularly, the UE and the AMF) can shift to the registered state (RM-REGISTERED state) based on completion of the registration procedure.

Further, the registration procedure may be a procedure for updating location registration information of the UE in the network, and/or for periodically providing a notification of the state of the UE from the UE to the network, and/or for updating a specific parameter related to the UE in the network.

The UE may initiate the registration procedure at the time of mobility across TAs. In other words, the UE may initiate the registration procedure in a case that the UE moves to a TA that is different from a TA indicated by the TA list that the UE holds. Further, the UE may initiate the present procedure in a case that a running timer expires. Further, the UE may initiate the registration procedure in a case that update of context of each device is needed due to disconnection or invalidation of the PDU session. Further, the UE may initiate the registration procedure in a case that some change occurs in capability information and/or a preference related to the PDU session establishment of the UE. Further, the UE may periodically initiate the registration procedure. Further, the UE may initiate the registration procedure based on completion of the generic UE configuration update procedure. Note that the timing is not limited thereto and the UE can perform the registration procedure at an arbitrary timing.

Further, the UE may periodically initiate the registration procedure even in the registered state. In other words, the UE may initiate the registration procedure based on expiration of the timer. Further, the UE may initiate the registration procedure in a state in which LADN information is stored. Moreover, the UE may initiate the registration procedure in a state in which the PDU session has been established. Note that the PDU session may be a PDU session correlated with the LADN information or may be a PDU session for the LADN. Further, the PDU session may be a PDU session correlated to the NSSAI.

Note that the registration procedure performed based on the mobility of the UE and the registration procedure periodically performed may be expressed as a registration procedure for mobility and registration update. In other words, the registration procedure for mobility and registration update may be a registration procedure performed based on the mobility of the UE or may be a registration procedure periodically performed. Further, the registration procedure for mobility and registration update may be a registration procedure performed based on configuration update of the UE. Further, the registration procedure for mobility and registration update may be a registration procedure performed to establish a communication path for transmitting and receiving user data. Further, the registration procedure for mobility and registration update may be a registration procedure performed based on a request from the network. Further, in other words, the registration procedure for mobility and registration update may be a registration procedure other than an initial registration procedure. Hereinafter, the registration procedure for mobility and registration update may be expressed as the present procedure.

Next, each step in the registration procedure will be described. Note that the registration procedure described below may be the initial registration procedure or may be the registration procedure for mobility and registration update.

First, the UE initiates the registration procedure by transmitting a registration request message to the AMF (S800), (S802), and (S804). Specifically, the UE transmits an RRC message including the registration request message to the 5G AN (or gNB) (S800). Note that the registration request message is an NAS message. Also, the RRC message may be a control message transmitted and received between the UE and the 5G AN (or gNB). Further, the NAS message is processed by the NAS layer, and the RRC message is processed by the RRC layer. Note that the NAS layer is a higher layer than the RRC layer.

Here, although the UE can transmit at least the first identification information with the first identification information included in the registration request message and/or the RRC message, the UE may transmit the first identification information with the first identification information included in a control message different from these messages, for example, a control message of a lower layer than the RRC layer (for example, the MAC layer, the RLC layer, or the PDCP layer). Note that the UE may indicate that the UE supports each function or may indicates a request of the UE by transmitting such identification information. Further, in a case that a plurality of pieces of identification information are transmitted and received, two or more pieces of identification information out of the identification information may be configured as one or more pieces of identification information. Note that the information indicating the support of each function and the information indicating a request of utilization of each function may be transmitted and received with the same identification information or may be transmitted or received as different identification information.

In a case that the UE supports the extension of the LADN service area, the UE may configure information indicating the support of the extension of the LADN service area in the first identification information or may transmit the first identification information indicating the support of the extension of the LADN service area with the first identification information included in the registration request message, On the contrary, in a case that the extension of the LADN service area is not supported, the UE may configure information indicating that the extension of the LADN service area is not supported in the first identification information, may transmit the first identification information indicating that the extension of the LADN service area is not supported with the first identification information included in the registration request message, or may not transmit the first identification information.

In a case that the utilization restriction of the extension of the LADN service area is supported, the UE may configure, in the first identification information, information indicating the support of the utilization restriction of the extension of the LADN service area or may include the first identification information indicating the support of the utilization restriction of the extension of the LADN service area with the first identification information included in the registration request message. On the contrary, in a case that the utilization restriction of the extension of the LADN service area is not supported, the UE may configure, in the first identification information, information indicating that the utilization restriction of the extension of the LADN service area is not supported, may transmit the first identification information indicating that the utilization restriction of the extension of the LADN service area is not supported with the first identification information included in the registration request message, or may not transmit the first identification information.

Moreover, the UE may indicate that the UE supports the extension of the LADN service area by transmitting the first identification information. In this case, the first identification information may be information indicating the support of the extension of the LADN service area.

On the contrary, the UE may indicate that the UE supports the utilization restriction of the extension of the LADN service area by transmitting the first identification information. In this case, the first identification information may be information indicating the support of the utilization restriction of the extension of the LADN service area.

In addition, the UE may initiate the PDU session establishment procedure during the registration procedure by transmitting an SM message (for example, a PDU session establishment request message) with the SM message included in the registration request message or by transmitting the SM message (for example, the PDU session establishment request message) along with the registration request message.

In a case that the 5G AN (or gNB) receives the RRC message including the registration request message, then the 5G AN (or gNB) selects an AMF to which the registration request message is to be transferred (S802). Note that the 5G AN (or gNB) can select the AMF based on the information included in the registration request message and/or the RRC message. The 5G AN (or gNB) extracts the registration request message from the received RRC message and transfers the registration request message to the selected AMF (S804).

The AMF can perform first determination of whether condition is met in a case that the registration request message is received. The first determination of whether condition is met is performed to determine whether or not the network (or the AMF) will accept the request from the UE. The AMF initiates the procedure in (A) of FIG. 6, in a case in which the result of the first determination of whether condition is met is true, while the AMF initiates the procedure in (B) of FIG. 6 in a case that the result of the first determination of whether condition is met is false.

Note that the first determination of whether condition is met may be performed based on reception of the registration request message, and/or each piece of identification information included in the registration request message, and/or subscriber information, and/or capability information of the network, and/or an operator policy, and/or a state of the network, and/or user registration information, and/or context that the AMF holds, and/or the like. For example, the result of the first determination of whether condition is met may be true in a case that the network allows the request from the UE, and the result of the first determination of whether condition is met may be false in a case that the network does not allow the request from the UE. Furthermore, the result of the first condition may be true in a case that the network in which the UE is registered and/or the device in the network supports the function requested by the UE, and the result of the first determination of whether condition is met may be false in a case that the function requested by the UE is not supported. Further, the result of the first determination of whether condition is met may be true in a case that the identification information transmitted and received is allowed, and the result of the first determination of whether condition is met may be false in a case that the identification information transmitted and received is not allowed. Note that conditions for determining whether the result of the first determination of whether condition is met is true or false may not be limited to the aforementioned conditions.

First, a case in which the result of the first determination of whether condition is met is true will be described. The AMF can perform fourth determination of whether condition is met first in the procedure in (A) of FIG. 6. The fourth determination of whether condition is met is for determining whether or not the AMF is to transmit and receive the SM message to and from the SMF.

Note that the fourth determination of whether condition is met may be performed based on whether or not the AMF has received the SM message. Also, the fourth determination of whether condition is met may be performed based on whether the SM message is included in the registration request message. For example, the result of the fourth determination of whether condition is met may be true in a case that the AMF receives the SM message and/or the SM message is included in the registration request message, and the result of the fourth determination of whether condition is met may be false in a case that the AMF does not receive the SM message and/or the SM message is not included in the registration request message. Note that conditions for determining whether the result of the fourth determination of whether condition is met is true or false may not be limited to the aforementioned conditions.

The AMF selects the SMF and performs transmission and reception of the SM message to and from the selected SMF in a case that the result of the fourth determination of whether condition is met is true, and the AMF does not perform these in a case that the result of the fourth determination of whether condition is met is false (S806). Further, the AMF may stop the procedure in (A) of FIG. 6 in a case that an SM message indicating reject is received from the SMF even in a case that the result of the fourth determination of whether condition is met is true. At this time, the AMF may initiate the procedure in (B) of FIG. 6.

Note that the AMF can provide a notification of the identification information received in the registration request message to the SMF in a case that the AMF transmits and receives the SM message to and from the SMF in S806. The SMF can acquire the identification information received from the AMF through the transmission and the reception of the SM message to and from the AMF.

Next, the AMF transmits, to the UE, a registration accept message as a response message to the registration request message via the 5G AN (or gNB) based on the reception of the registration request message and/or the completion of the transmission and reception of the SM message to and from the SMF (S808). In a case that the result of the fourth determination of whether condition is met is false, for example, the AMF may transmit the registration accept message based on the reception of the registration request message from the UE. Also, in a case that the result of the fourth determination of whether condition is met is true, the AMF may transmit the registration accept message based on the completion of the transmission and the reception of the SM message to and from the SMF. Note that the registration accept message is an NAS message transmitted and received on the N1 interface and is transmitted and received with the registration reception message included in the RRC message between the UE and the 5G AN (gNB).

The AMF may transmit one or more pieces of identification information out of at least eleventh to fourteenth identification information with the identification information included in the registration accept message. Note that the AMF may indicate that the network supports each function or may indicate that the request from the UE has been accepted, by transmitting such identification information. Further, in a case that a plurality of pieces of identification information are transmitted and received, two or more pieces of identification information out of the identification information may be configured as one or more pieces of identification information. Note that the information indicating the support of each function and the information indicating a request of utilization of each function may be transmitted and received with the same identification information or may be transmitted or received as different identification information.

In a case that the extension of the LADN service area is supported, the AMF may configure, in the eleventh identification information, information indicating the support of the extension of the LADN service area, or may transmit the eleventh identification information indicating the support of the extension of the LADN service area with the eleventh identification information included in the registration accept message. On the contrary, in a case that the extension of the LADN service area is not supported, the AMF may configure, in the eleventh identification information, information indicating that the extension of the LADN service area is not supported, may transmit the eleventh identification information indicating that the extension of the LADN service area is not supported with the eleventh identification information included in the registration accept message, or may transmit the eleventh identification information.

Also, in a case that the utilization restriction of the extension of the LADN service area is supported, the AMF may configure, in the eleventh identification information, information indicating the support of the utilization restriction of the extension of the LADN service area or may transmit the eleventh identification information indicating the support of the utilization restriction of the extension of the LADN service area with the eleventh identification information included in the registration accept message, On the contrary, in a case that the utilization restriction of the extension of the LADN service area is not supported, the AMF may configure, in the eleventh identification information, information indicating that the utilization restriction of the extension of the LADN service area is not supported, may transmit the eleventh identification information indicating that the utilization restriction of the extension of the LADN service area is not supported with the eleventh identification information included in the registration accept message, or may not transmit the eleventh identification information.

Further, the AMF may indicate that the network supports the extension of the LADN service area by transmitting the eleventh identification information. Further, the AMF may indicate that the extension of the LADN service area can be used by transmitting the eleventh identification information. Further, the AMF may indicate that the network has allowed the utilization of the extension of the LADN service area by transmitting the eleventh identification information. In this case, the eleventh identification information may be information indicating the support of the extension of the LADN service area.

On the contrary, the AMF may indicate that the network does not support the extension of the LADN service area by transmitting the eleventh identification information indicating that the extension of the LADN service area is not supported or by not transmitting the eleventh identification information. Further, the AMF may indicate that the extension of the LADN service area cannot be used by transmitting the eleventh identification information indicating that the extension of the LADN service area is not supported or by not transmitting the eleventh identification information. Further, the AMF may indicate that the network does not allow the utilization of the extension of the LADN service area by transmitting the eleventh identification information indicating that the extension of the LADN service area is not supported or by not transmitting the eleventh identification information.

Further, the AMF may indicate that the network supports the utilization restriction of the extension of the LADN service area by transmitting the eleventh identification information. Further, the AMF may indicate that utilization of the extension of the LADN service area is limited by transmitting the eleventh identification information. In this case, the eleventh identification information may be information indicating the support of the utilization restriction of the extension of the LADN service area.

On the contrary, the AMF may indicate that the network does not support the utilization restriction of the extension of the LADN service area by transmitting the eleventh identification information indicating that the utilization restriction of the extension of the LADN service area is not supported or by not transmitting the eleventh identification information. Further, the AMF may indicate that the utilization of the extension of the LADN service area is not restricted by transmitting the eleventh identification information indicating that the utilization restriction of the extension of the LADN service area is not supported or by not transmitting the eleventh identification information.

Here, the AMF may transmit the eleventh identification information based on the first identification information. Specifically, in a case that the first identification information is information indicating the support of the extension of the LADN service area, the AMF may transmit, to the UE, the eleventh identification information indicating the support of the extension of the LADN service area. On the contrary, in a case that the first identification information is information indicating that the extension of the LADN service area is not supported, the AMF may transmit, to the UE, the eleventh identification information indicating that the extension of the LADN service area is not supported.

Further, in a case that the first identification information is information indicating the support of the utilization restriction of the extension of the LADN service area, and further the AMF has decided to restrict the utilization of the extension of the LADN service area, the AMF may configure, in the eleventh identification information, information indicating the utilization restriction of the extension of the LADN service area or may transmit, to the UE, the eleventh identification information indicating the utilization restriction of the extension of the LADN service area. On the contrary, in a case that the first identification information is information indicating that the extension of the LADN service area is not supported, the AMF may not transmit the eleventh identification information.

Further, the AMF may indicate that the network supports the LADN or may indicate that the network allows the connection to the LADN, by transmitting the twelfth identification information. Further, the AMF may provide, to the UE, a notification of a list of DNNs that can be used for connection to the LADN and/or an LADN service area that is an area where the connection to the LADN can be made, by transmitting the twelfth identification information. Further, the AMF may provide, to the UE, a notification of one or a plurality of S-NSSAIs that can be used for the connection to the LADN, by transmitting the twelfth identification information. Note that the S-NSSAI that can be used for connection to the LADN and the DNN and/or the LADN service area that can be used for connection to the LADN may be associated with each other.

Here, the AMF may transmit the twelfth identification information based on the first identification information. Specifically, in a case that the first identification information is information indicating the support of the extension of the LADN service area, the AMF may configure the extended LADN service area as the LADN service area, may configure the extended LADN information as the LADN information, and may transmit, to the UE, the configured LADN information as the twelfth identification information. On the contrary, in a case that the first identification information is information indicating that the extension of the LADN service area is not supported, the AMF may configure the conventional LADN service area as the LADN service area, may configure the conventional LADN information as the LADN information, and may transmit, to the UE, the configured LADN information as the twelfth identification information.

On the contrary, the AMF may indicate that the network does not support the LADN or may indicate that the network does not allow connection to the LADN, by not transmitting the twelfth identification information. Further, the AMF may indicate that the LADN information stored in the UE is invalid or may indicate to the UE to invalidate the LADN information stored in the UE, by not transmitting the twelfth identification information. Further, the AMF may indicate that the LADN information stored in the UE requires to be deleted or may indicate to the UE to delete the LADN information stored in the UE, by not transmitting the twelfth identification information.

Further, the AMF may indicate that the network does not support the LADN or may indicate that the network does not allow the connection to the LADN, by transmitting the twelfth identification information that is blank. Further, the AMF may indicate that the LADN information stored in the UE is invalid or may indicate to the UE to invalidate the LADN information stored in the UE, by transmitting the twelfth identification information that is blank. Further, the AMF may indicate that the LADN information stored in the UE requires to be deleted or may indicate to the UE to delete the LADN information stored in the UE, by transmitting the twelfth identification information that is blank.

Here, the AMF may transmit the first identification information based on the second identification information. Specifically, in a case that the second identification information indicates a request for the LADN information, the AMF may include the twelfth identification information in the registration accept message or may transmit the twelfth identification information to the UE. Further, the AMF may also include the twelfth identification information in the registration accept message or may transmit the twelfth identification information to the UE in a case that the second identification information indicates a request for updating the LADN information. On the contrary, in a case that the second identification information indicates a request for deleting the LADN information, the AMF may not include the twelfth identification information in the registration accept message or may not transmit the twelfth identification information to the UE. Further, in the case that the second identification information indicates a request for deleting the LADN information, the AMF may include the twelfth identification information that is blank in the registration accept message or may transmit the twelfth identification information that is blank to the UE.

Further, in a case that it is desired to invalidate the LADN information stored in the UE, the AMF may not include the twelfth identification information in the registration accept message or may not transmit the twelfth identification information to the UE. Further, in the case that it is desired to invalidate the LADN information stored in the UE, the AMF may include the twelfth identification information that is blank in the registration accept message or may transmit the twelfth identification information that is blank to the UE. Further, in a case that it is desired to delete the LADN information stored in the UE, the AMF may not include the twelfth identification information in the registration accept message or may not transmit the twelfth identification information to the UE. Further, in the case that it is desired to delete the LADN information stored in the UE, the AMF may include the twelfth identification information that is blank in the registration accept message or may transmit the twelfth identification information that is blank to the UE.

Further, in a case that the AMF does not include the twelfth identification information in the registration accept message during the registration procedure for mobility and registration update, the AMF may recognize that the old LADN information is invalid or may delete the old LADN information. In this case, in a case that a PDU session for the LADN has been established, the AMF may locally release the PDU session for the LADN or may request the SMF for the local releasing of the PDU session for the LADN.

More specifically, in the case that the AMF does not include the twelfth identification information in the registration accept message during the registration procedure for mobility and registration update, the AMF may recognize that the old LADN information is invalid or may delete the old LADN information. In this case, in a case that a PDU session for one or a plurality of LADNs has been established, the AMF may locally release the PDU session for all the LADNs or may request the SMF for the local releasing of the PDU session for all the LADNs.

Further, in a case that the AMF does not include the twelfth identification information in the registration accept message during the registration procedure for mobility and registration update, the AMF may recognize that the old LADN information is invalid or may delete the old LADN information. In this case, in the case that the PDU session for the LADN has been established, the AMF may request the SMF for the releasing of the PDU session for the LADN. In this case, the SMF may initiate the network-requested PDU session release procedure.

More specifically, in the case that the AMF does not include the twelfth identification information in the registration accept message during the registration procedure for mobility and registration update, the AMF may recognize that the old LADN information is invalid or may delete the old LADN information. In this case, in a case that a PDU session for one or a plurality of LADNs has been established, the AMF may request the SMF for the releasing of the PDU session for all the LADNs. In this case, the SMF may initiate the network-requested PDU session release procedure.

Further, in a case that the LADN information correlated with the PDU session for the LADN is not included in the registration accept message, the AMF may recognize that the old LADN information is invalid or may delete the old LADN information. In this case, the AMF may locally release the PDU session for the LADN or may request the SMF for the local releasing of the PDU session for the LADN.

Further, in a case that the LADN information correlated with the PDU session for the LADN is not included in the registration accept message, the AMF may recognize that the old LADN information is invalid or may delete the old LADN information. In this case, the AMF may request the SMF for the releasing of the PDU session for the LADN.

Further, in a case that the LADN information correlated with the PDU session for the LADN is not included in the registration accept message, the AMF may recognize that the old LADN information is invalid or may delete the old LADN information. In this case, the AMF may request the SMF for the releasing of the PDU session for the LADN. In this case, the SMF may initiate the network-requested PDU session release procedure.

Further, in a case that the LADN information correlated with the PDU session for the LADN is not included in the registration accept message, the AMF may recognize that the old LADN information is invalid or may delete the old LADN information. In this case, the AMF may request the SMF for the releasing of the PDU session for the LADN. In this case, the SMF may initiate the network-requested PDU session release procedure.

Further, the AMF may indicate granularity of the LADN service area by transmitting the thirteenth identification information. More specifically, the AMF may indicate the granularity of the LADN service area indicated by the LADN service area information included in the LADN information indicated by the twelfth identification information or may provide a notification of the area that can be used as the LADN service area, by transmitting the thirteenth identification information along with the twelfth identification information. Specifically, the AMF may indicate that the LADN service area indicated by the LADN service area information included in the twelfth identification information is an area configured with one or a plurality of tracking areas or may indicate that the LADN service area is an area that is different from the area configured with one or a plurality of tracking areas, by transmitting the thirteenth identification information along with the twelfth identification information. Further, the AMF may indicate that the tracking area ID list is included as the LADN service area information, may indicate that information requiring assistance of the RAN is included, or may indicate that the information that requires assistance of the RAN is included, by transmitting the thirteenth identification information along with the twelfth identification information.

Here, the AMF may determine whether or not to transmit the thirteenth identification information based on the first identification information. Specifically, in a case that the first identification information is information indicating the support of the extension of the LADN service area, the AMF may transmit the thirteenth identification information to the UE. On the contrary, in a case that the first identification information is information indicating that the extension of the LADN service area is not supported, the AMF may not transmit the thirteenth identification information to the UE.

Further, the AMF may indicate the period during which the LADN service area is valid, by transmitting the fourteenth identification information. More specifically, the AMF may indicate the period during which the LADN service area indicated by the LADN service area information included in the LADN information indicated by the twelfth identification information is valid, by transmitting the fourteenth identification information along with the twelfth identification information.

Here, the AMF may determine whether or not to transmit the fourteenth identification information based on the first identification information. Specifically, in a case that the first identification information is information indicating the support of the extension of the LADN service area, the AMF may transmit the fourteenth identification information to the UE. On the contrary, in a case that the first identification information is information indicating that the extension of the LADN service area is not supported, the AMF may not transmit the fourteenth identification information to the UE.

Further, the AMF may indicate that the extended LADN information and/or the extended LADN service area can be used or may provide a notification of the LADN information and/or the LADN service area information that can be used, by transmitting the eleventh identification information, and/or the thirteenth identification information, and/or the fourteenth identification information along with the twelfth identification information. In this case, the eleventh identification information may be the information indicating the support of the extension of the LADN service area, and the twelfth identification information may be the extended LADN information.

On the contrary, the AMF may indicate that the extended LADN information and/or the extended LADN service area cannot be used, by transmitting the eleventh identification information and/or the twelfth identification information and not transmitting the thirteenth identification information and/or the fourteenth identification information. In other words, the AMF may indicate that the conventional LADN information and/or the conventional LADN service area can be used or may provide a notification of the LADN information and/or the LADN service area information that can be used, by transmitting the eleventh identification information and/or the twelfth identification information and not transmitting the thirteenth identification information and/or the fourteenth identification information. In this case, the eleventh identification information may be the information indicating that the extension of the LADN service area is not supported, and the twelfth identification information may be the conventional LADN information.

Further, the AMF may indicate that the extended LADN information and/or the extended LADN service area cannot be used, by transmitting the twelfth identification information and not transmitting the eleventh identification information, and/or the thirteenth identification information, and/or the fourteenth identification information. In other words, the AMF may indicate that the conventional LADN information and/or the conventional LADN service area can be used or may provide a notification of the LADN information and/or the LADN service area information that can be used, by transmitting the twelfth identification information and not transmitting the eleventh identification information, and/or the thirteenth identification information, and/or the fourteenth identification information. In this case, the twelfth identification information may be conventional LADN information.

Note that the AMF may select and determine which identification information is to be included in the registration accept message from the eleventh to fourteenth identification information based on each piece of received identification information, and/or subscriber information, and/or capability information of the network, and/or an operator policy, and/or a state of a network, and/or user registration information, and/or context that the AMF holds.

Also, the AMF can transmit the SM message (for example, the PDU session establishment accept message) with the SM message included in the registration accept message or can transmit the SM message (for example, the PDU session establishment accept message) along with the registration accept message. In addition, the transmission method may be performed in a case that the SM message (for example, the PDU session establishment request message) is included in the registration request message and the result of the fourth determination of whether condition is met is true. Furthermore, the transmission method may be performed in a case that the registration request message and the SM message (e.g., the PDU session establishment request message) are included and the fourth determination of whether condition is met is true. The AMF can indicate that the procedure for the SM has been accepted in the registration procedure by performing such a transmission method.

Also, the AMF may indicate that the request from the UE has been accepted by transmitting the registration accept message based on each piece of received identification information, and/or subscriber information, and/or capability information of the network, and/or an operator policy, and/or a state of the network, and/or user registration information, and/or context that the AMF holds, and/or the like.

Further, the AMF may transmit information indicating that some requests from the UE have been rejected with the information included in the registration accept message or may indicate the cause of the rejection of some requests from the UE, by transmitting the information indicating that some requests from the UE have been rejected. Furthermore, the UE may recognize the cause of the rejection of some requests from the UE, by receiving the information indicating that some requests from the UE have been rejected. Note that the cause of the rejection may be information indicating that content indicated by the identification information that the AMF has received has not been allowed.

The UE receives the registration accept message via the 5G AN (gNB) (S808). The UE can recognize that the request from the UE using the registration request message has been accepted and content of various kinds of identification information included in the registration accept message, by receiving a registration accept message.

The UE can further transmit a registration complete message as a response message to the registration accept message to the AMF via the 5G AN (gNB) (S810). Note that in a case that the UE has received the SM message such as a PDU session establishment accept message, the UE may transmit the SM message such as a PDU session establishment complete message with the SM message included in the registration complete message or may indicate that the procedure for the SM has been completed by including the SM message. Here, although the registration complete message is an NAS message transmitted and received on the N1 interface, the registration complete message is transmitted and received with the registration complete message included in the RRC message between the UE and the 5G AN (gNB).

The AMF receives the registration complete message via the 5G AN (gNB) (S810). Also, each device completes the procedure in (A) of FIG. 6 based on transmission and reception of the registration accept message and/or the registration complete message.

Next, a case that the result of the first determination of whether condition is met is false will be described. In the procedure in (B) of FIG. 6, the AMF transmits a registration reject message as a response message to the registration request message to the UE via the 5G AN (gNB) (S812). Here, although the registration reject message is an NAS message transmitted and received on the N1 interface, the NAS message is transmitted and received with the NAS message included in the RRC message between the UE and the 5G AN (gNB).

Note that the AMF may indicate that the request from the UE using the registration request message has been rejected, by transmitting the registration reject message. Further, the AMF may transmit information indicating the cause of the rejection with the information included in the registration reject message or may indicate the cause of the rejection by transmitting the cause of the rejection. Further, the UE may recognize the cause of the rejection of the request from the UE, by receiving the information indicating the cause that the request from the UE has been rejected. Note that the cause of the rejection may be information indicating that content indicated by the identification information that the AMF has received has not been allowed.

The UE receives the registration reject message via the 5G AN (gNB) (S812). The UE can recognize that the request from the UE using the registration request message has been rejected and content of each piece of identification information included in the registration reject message, by receiving the registration reject message. Further, the UE may recognize that the request from the UE has been rejected in a case that the registration reject message is not received even after a predetermined period has elapsed after transmission of the registration request message. Each device completes the procedure of (B) in the present procedure based on transmission and reception of the registration reject message.

Figure 6:
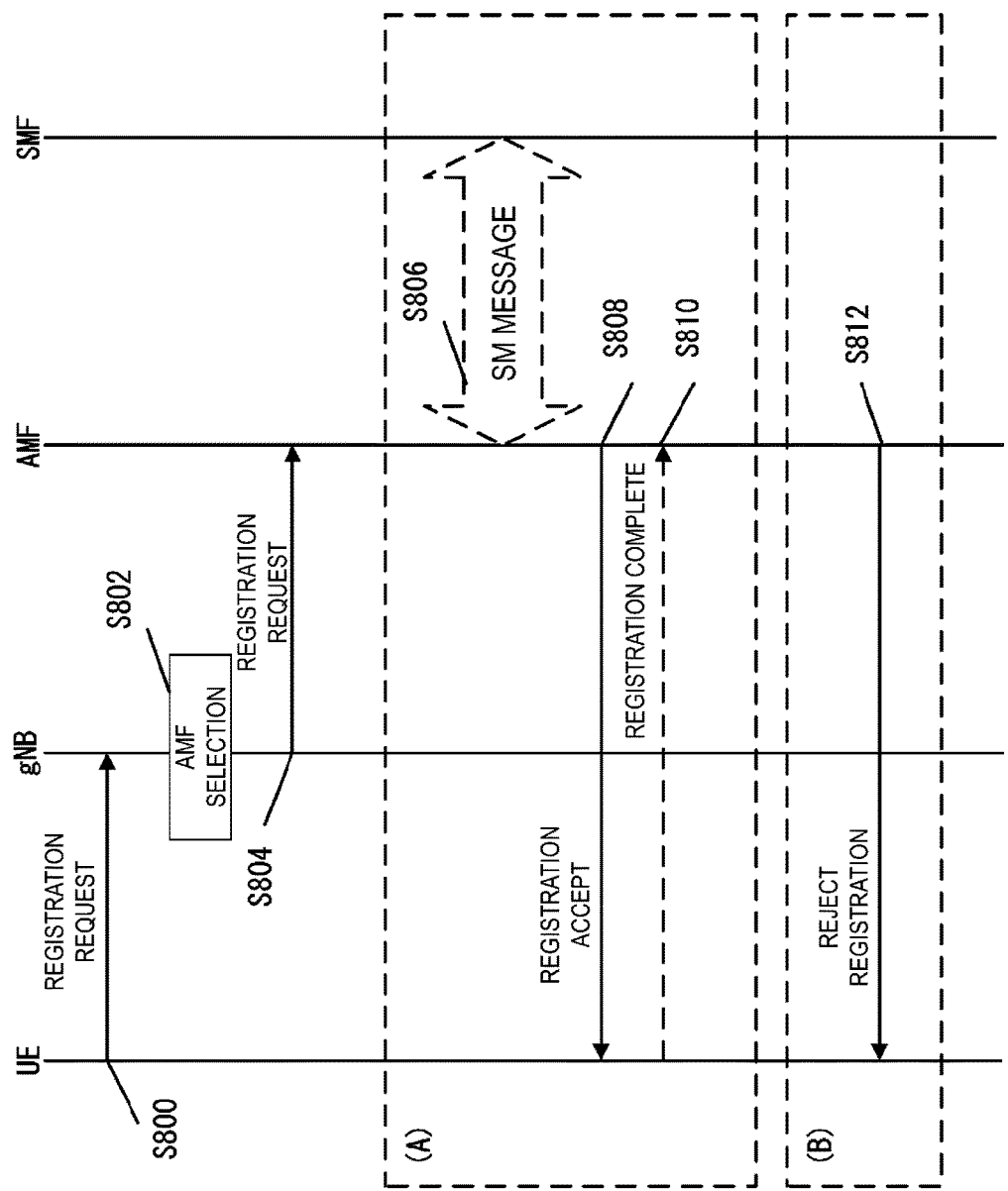
FIG. 6 is a diagram for explaining a registration procedure.

Note that the procedure in (B) of FIG. 6 may be initiated in a case that the procedure in (A) of FIG. 6 is stopped. Note that in a case that the result of the fourth determination of whether condition is met is true in the procedure in (A) of FIG. 6, the AMF may transmit the SM message that indicates rejection, such as a PDU session establishment reject message with the SM message included in the registration reject message or may indicate that the procedure for the SM has been rejected by including the SM message that indicates the rejection. In that case, the UE may further receive the SM message, such as the PDU session establishment reject message, that indicates rejection, or may recognize that the procedure for SM has been rejected.

Each device completes the registration procedure based on the completion of the procedure in (A) and (B) of FIG. 6. Note that each device may transition to a state in which the UE is registered in the network (RM_REGISTERED state) based on the completion of the procedure in (A) of FIG. 6, or may maintain a state in which the UE is not registered in the network (RM_DEREGISTERED state) or may transition to the state in which the UE is not registered in the network based on the completion of the procedure in (B) of FIG. 6. Transition to each state of each device may be performed based on completion of the registration procedure, or may be performed based on establishment of a PDU session.

Further, each device may perform the processing based on the information transmitted and received in the registration procedure, based on the completion of the registration procedure. In a case that the UE has transmitted and received the information indicating that some requests from the UE have been rejected, each device may recognize the cause of the rejection of the requests from the UE. Further, each device may perform the present procedure again or may perform the registration procedure on the core network_B or another cell, based on the cause of the rejection of the requests from the UE.

Furthermore, the UE may store the registration accept message and/or the identification information received along with the registration reject message or may recognize determination of the network, based on the completion of the registration procedure.

For example, the UE may recognize that the network supports the extension of the LADN service area in a case that the eleventh identification information is received. Further, the UE may recognize that the utilization of the extension of the LADN service area has been allowed in a case that the eleventh identification information is received. In other words, in a case that the UE receives the eleventh identification information, the UE may recognize that not only an area configured with one or a plurality of tracking areas but also an area that is different from the area configured with one or a plurality of tracking areas can be configured as the LADN service area or may recognize that the areas can be used as the LADN service area. In a case that the UE receives the eleventh identification information, the UE may recognize that the LADN service area can be changed depending on a time. In these cases, the eleventh identification information may be information indicating the support of the extension of the LADN service area. Further, in these cases, the UE may establish the PDU session for the LADN or may perform communication with the LADN, using the extended LADN information and/or the extended LADN service area.

On the contrary, in a case that the UE has received the eleventh identification information indicating that the extension of the LADN service area is not supported or the UE has not received the eleventh identification information, the UE may recognize that the network does not support the extension of the LADN service area. Further, in a case that the UE has received the eleventh identification information indicating that the extension of the LADN service area is not supported or has not received the eleventh identification information, the UE may recognize that the utilization of the extension of the LADN service area is not allowed. In other words, in a case that the UE has received the eleventh identification information indicating that the extension of the LADN service area is not supported or has not received the eleventh identification information, the UE may recognize that only the area configured with one or a plurality of tracking areas can be configured as the LADN service area or may recognize that the area can be used as the LADN service area. In a case that the UE has received the eleventh identification information indicating that the extension of the LADN service area is not supported or has hot received the eleventh identification information, the UE may recognize that the LADN service area cannot be changed depending on a time. In these cases, the UE may establish a PDU session for the LADN or may perform communication with the LADN using the conventional LADN information and/or the conventional LADN service area.

Further, in a case that the UE has received the eleventh identification information, the UE may recognize that the network supports the utilization restriction of the extension of the LADN service area. Further, in the case that the UE has received the eleventh identification information, the UE may recognize that the utilization of the extension of the LADN service area is restricted. In this case, the eleventh identification information may be information indicating the support of the utilization restriction of the extension of the LADN service area.

On the contrary, in a case that the UE has received the eleventh identification information indicating that the utilization restriction of the extension of the LADN service area is not supported or has not received the eleventh identification information, the UE may recognize that the network does not support the utilization restriction of the extension of the LADN service area. Further, in the case that the UE has received the eleventh identification information indicating that the utilization restriction of the extension of the LADN service area is not supported or has not received the eleventh identification information, the UE may recognize that the utilization of the extension of the LADN service area is not restricted. Note that in a case that the utilization of the extension of the LADN service area is restricted, the UE may be prevented from using the extended LADN service area.

Further, in a case that the UE has received the twelfth identification information, the UE may recognize that the network supports the LADN or may recognize that connection to the LADN has been allowed. Further, in the case that the UE has received the twelfth identification information, the UE may recognize a list of DNNs that can be used for connection to the LADN and/or an LADN service area that is an area where connection to the LADN can be made or store the list and/or the LADN service area in the context. Further, in a case that the UE has received the twelfth identification information, the UE may recognize one or a plurality of S-NSSAIs that can be used for connection to the LADN or may store one or a plurality of S-NSSAI in the context. Further, the UE may recognize that the S-NSSAI that can be used for connection to the LADN, the DNN that can be used for connection to the LADN, and/or the LADN service area have been associated with each other or may store the S-NSSAI that can be used for connection to the LADN, the DNN that can be used for connection to the LADN, and/or the LADN service area in the context in an associated manner.

In other words, in the case that the UE has received the twelfth identification information, the UE may recognize that a PDU session for the LADN correlated with the received LADN DNN can be established or may recognize that the PDU session for the LADN correlated with the received LADN S-NSSAI can be established. Further, in the case that the UE has received the twelfth identification information, the UE may recognize that a PDU session for the LADN correlated with a combination of the received LADN DNN and the LADN S-NSSAI can be established.

Further, in other words, in a case that the UE has received the twelfth identification information, the UE may recognize that the LADN service area is an area where a PDU session for the LADN correlated with the LADN DNN can be established or may recognize that the LADN service area is an area where a PDU session for the LADN correlated with the LADN S-NSSAI can be established. Further, in the case that the UE has received the twelfth identification information, the UE may recognize that the received LADN service area is an area where a PDU session for the LADN correlated with a combination of the LADN DNN and the LADN S-NSSAI can be established.

On the contrary, in a case that the UE has not received the twelfth identification information, the UE may recognize that the network does not support the LADN or may recognize that connection to the LADN is not allowed. Further, in the case that the UE has not received the twelfth identification information, the UE may recognize that the LADN information stored in the UE is invalid or may invalidate the LADN information stored in the UE. Further, in the case that the UE has not received the twelfth identification information, the UE may recognize that the LADN information stored in the UE requires to be deleted or may delete the LADN information stored in the UE.

Further, in a case that the UE has received twelfth identification information that is blank, the UE may recognize that the network does not support the LADN or may recognize that connection to the LADN is not allowed. Further, in the case that the UE has received the twelfth identification information that is blank, the UE may recognize that the LADN information stored in the UE is invalid or may invalidate the LADN information stored in the UE. Further, in the case that the UE has received the twelfth identification information that is blank, the UE may recognize that the LADN information stored in the UE requires to be deleted or may delete the LADN information stored in the UE.

In these cases, in a case that the UE has a PDU session for the LADN, the UE may locally release the PDU session for the LADN. More specifically, in these cases, in a case that the UE has a PDU session for one or a plurality of LADNs, the UE may locally release the PDU session for all the LADNs. Further, in these cases, in a case that the UE has a PDU session for the LADN, the PDU session for the LADN may be released. More specifically, in these cases, in a case that the UE has a PDU session for one or a plurality of LADNs, the PDU session for all the LADNs may be released.

Further, in these cases, in a case that the UE has a PDU session for the LADN, the UE may release the PDU session for the LADN through a network-requested PDU session release procedure. Further, in these cases, in a case that the UE has a PDU session for the LADN, the UE may release the PDU session for the LADN through a UE-requested PDU session release procedure. Further, in these cases, in a case that the UE has a PDU session for the LADN, the UE may initiate the UE-requested PDU session release procedure to release the PDU session for the LADN.

Further, in these cases, in a case that the UE has a PDU session correlated with the old LADN information, the UE may locally release the PDU session. Further, in these cases, in a case that the UE has one or a plurality of PDU sessions correlated with the old LADN information, the UE may locally release all the PDU sessions correlated with the old LADN information.

Further, in a case that the AMF does not include the twelfth identification information in the registration accept message during the registration procedure for mobility and registration update, the UE may delete the old LADN information. In this case, in a case that the UE has a PDU session for the LADN, the UE may locally release the PDU session for the LADN.

More specifically, in a case that the AMF does not include the twelfth identification information in the registration accept message during the registration procedure for mobility and registration update, the UE may delete the old LADN information. In this case, in a case that the UE has a PDU session for one or a plurality of LADNs, the UE may locally release the PDU session for all the LADNs.

Further, in a case that the AMF does not include the twelfth identification information in the registration accept message during the registration procedure for mobility and registration update, the UE may delete the old LADN information. In this case, in a case that the UE has a PDU session for the LADN, the PDU session for the LADN may be released.

More specifically, in a case that the AMF does not include the twelfth identification information in the registration accept message during the registration procedure for mobility and registration update, the UE may delete the old LADN information. In this case, in a case that the UE has a PDU session for one or a plurality of LADNs, the PDU session for all the LADNs may be released.

Further, in a case that the AMF does not include the twelfth identification information in the registration accept message during the registration procedure for mobility and registration update, the UE may delete the old LADN information. In this case, in a case that the UE has a PDU session for the LADN, the UE may release the PDU session for the LADN through a network-requested PDU session release procedure.

Further, in a case that the AMF does not include the twelfth identification information in the registration accept message during the registration procedure for mobility and registration update, the UE may delete the old LADN information. In this case, in a case that the UE has a PDU session for the LADN, the UE may release the PDU session for the LADN through a UE-requested PDU session release procedure.

Further, in a case that the AMF does not include the twelfth identification information in the registration accept message during the registration procedure for mobility and registration update, the UE may delete the old LADN information. In this case, in a case that the UE has a PDU session for the LADN, the UE may initiate the UE-requested PDU session release procedure to release the PDU session for the LADN.

Further, in a case that the AMF does not include the twelfth identification information in the registration accept message during the registration procedure for mobility and registration update, the UE may delete the old LADN information. In this case, in a case that the UE has a PDU session correlated with the old LADN information, the UE may locally release the PDU session.

Further, in a case that the AMF does not include the twelfth identification information in the registration accept message during the registration procedure for mobility and registration update, the UE may delete the old LADN information. In this case, in a case that the UE has one or a plurality of PDU sessions correlated with the old LADN information, the UE may locally release all the PDU sessions correlated with the old LADN information.

Further, in a case that the old LADN information is deleted, the UE may recognize that the UE is located outside the LADN service area. Moreover, the UE may maintain the PDU session for the LADN even in the case that the UE is located outside the LADN service area. Specifically, the UE may maintain the PDU session for the LADN until a PDU session release command message is received even in the case that the UE is located outside the LADN service area. Note that the PDU session release command message may be a message transmitted and received in the network-requested PDU session release procedure or may be a message transmitted and received in the UE-requested PDU session release procedure.

Here, the PDU session for the LADN to be released as described above may be a PDU session correlated with the old LADN information. In other words, the PDU session for the LADN to be released may be a PDU session correlated with the LADN information to be deleted.

Further, the network-requested PDU session release procedure may be a procedure initiated by the SMF transmitting the PDU session release command message to the UE. The UE may release the PDU session based on reception of the PDU session release command message from the SMF and/or completion of the network-requested PDU session release procedure, in the network-requested PDU session release procedure.

Further, the UE-requested PDU session release procedure may be a procedure initiated by the UE transmitting the PDU session release request message to the SMF. The UE may receive, in the UE-requested PDU session release procedure, the PDU session release command message from the SMF as a response message to the PDU session release request message or may release the PDU session based on reception of the PDU session release command message from the SMF and/or completion of the UE-requested PDU session release procedure.

Note that each device having a PDU session may indicate that each device has established the PDU session. Specifically, the UE having a PDU session may indicate that the UE has established the PDU session. Further, the AMF having a PDU session may indicate that the AMF has established the PDU session. Further, the SMF having a PDU session may indicate that the SMF has established the PDU session.

Further, in a case that the UE has received the thirteenth identification information, the UE may recognize granularity of the LAD service area. More specifically, in a case that the UE has received the thirteenth identification information along with the twelfth identification information, the UE may recognize granularity of the LADN service area indicated by the LADN service area information included in the twelfth identification information or may store the granularity in the context in association with the LADN service area information. Specifically, in the case that the UE has received the thirteenth identification information along with the twelfth identification information, the UE may recognize that the LADN service area indicated by the LADN service area information is an area configured with one or a plurality of tracking areas or may recognize that the LADN service area is an area different from the area configured with one or a plurality of tracking areas, as granularity of the LADN service area. Further, in the case that the UE has received the thirteenth identification information along with the twelfth identification information, the UE may recognize that the tracking area ID list is included, may recognize that information that requires assistance of the RAN is included, or may recognize that information that does not require assistance of the RAN is included, as the LADN service area information.

On the contrary, in a case that the UE has not received the thirteenth identification information, the UE may use default granularity as the granularity of the LADN service area. Further, in a case that the thirteenth identification information is invalid information even in a case that the thirteenth identification information is received, and/or in a case that the UE does not support the extension of the LADN service area, the UE may ignore the received thirteenth identification information or may use default granularity as the granularity of the LADN service area. Here, the default granularity may be granularity configured in advance in the UE or may be granularity indicated by information previously received from the network. Further, in the case of the default granularity, the LADN service area may be an area configured with one or a plurality of tracking areas, and the LADN service area information may be a tracking area ID list.

Note that in a case that information indicating a plurality of LADNs is included in the twelfth identification information, the UE may store the granularity of the LADN service area in the context in association with the information indicating the LADNs, of each piece of the information indicating the LADNs. Further, in a case in which a plurality of pieces of LADN service area information are included in the twelfth identification information, the UE may store the granularity of the LADN service area in the context in association with the LADN service area information, for each piece of the LADN service area information.

Further, in a case that the UE has received the fourteenth identification information, the UE may recognize a period during which the LADN service area is valid. More specifically, in a case that the UE has received the fourteenth identification information along with the twelfth identification information, the UE may recognize the period during which the LADN service area indicated by the LADN service area information included in the twelfth identification information is valid or may store the period in the context in association with the LADN service area information.

On the contrary, in a case that the UE has not received the fourteenth identification information, the UE may use a default period as the period during which the LADN service area is valid. Further, in a case that the fourteenth identification information is invalid information even in a case that the UE has received the fourteenth identification information, and/or in a case that the UE does not support extension of the LADN service area, the UE may ignore the received fourteenth identification information or may use the default period as the period during which the LADN service area is valid. Here, the default period may be a period configured in advance in the UE or may be a period indicated by information previously received from the network. Further, the default period may be a period until the LADN information is updated.

Note that in a case that information indicating a plurality of LADNs is included in the twelfth identification information, the UE may store the period during which the LADN service area is valid in the context in association with the information indicating the LADNs, for each piece of the information indicating the LADNs. Further, in a case that a plurality of pieces of LADN service area information are included in the twelfth identification information, the UE may store the period during which the LADN service area is valid in the context in association with the LADN service area information, for each piece of the LADN service area information.

Further, in a case that the UE has received the eleventh identification information, and/or the thirteenth identification information, and/or the fourteenth identification information along with the twelfth identification information, the UE may recognize that the extended LADN information and/or the extended LADN service area can be used or may store the LADN information and/or the LADN service area information that can be used in the context. Further, in this case, the UE may recognize that the received LADN information is the extended LADN information or may store the received LADN information as the extended LADN information in the context. Moreover, in this case, the UE may recognize that the LADN service area indicated by the received LADN service area information is the extended LADN service area or may store the received LADN service area information as the LADN service area information indicating the extended LADN service area in the context. In this case, the eleventh identification information may be the information indicating the support of the extension of the LADN service area, and the twelfth identification information may be the extended LADN information.

On the contrary, in a case that the UE has received the eleventh identification information, and/or the twelfth identification information and has not received the thirteenth identification information and/or the fourteenth identification information, and/or in a case that the UE has received the twelfth identification information and has not received the eleventh identification information, and/or the thirteenth identification information, and/or the fourteenth identification information, the UE may recognize that the extended LADN information and/or the extended LADN service area cannot be used. Further, in this case, the UE may recognize that the conventional LADN information and/or the conventional LADN service area can be used or may store the LADN information and/or the LADN service area information that can be used in the context. Further, in this case, the UE may recognize that the received LADN information is the conventional LADN information or may store the received LADN information as the conventional LADN information in the context. Further, in this case, the UE may recognize that the LADN service area indicated by the received LADN service area information is the conventional LADN service area or may store the received LADN service area information as the LADN service area information indicating the conventional LADN service area in the context. In this case, the eleventh identification information may be information indicating that the extension of the LADN service area is not supported, and the twelfth identification information may be the conventional LADN information.

Further, in a case that the UE has received the twelfth identification information in a state in which the UE does not support the extension of the LADN service area, the UE may recognize that the extended LADN information and/or the extended LADN service area information cannot be used. Further, in this case, the UE may recognize that the conventional LADN information and/or the conventional LADN service area can be used or may store the LADN information and/or the LADN service area information that can be used in the context. Further, in this case, the UE may recognize that the received LADN information is the conventional LADN information or may store the received LADN information as the conventional LADN information in the context. Further, in this case, the UE may recognize that the LADN service area indicated by the received LADN service area information is the conventional LADN service area or may store the received LADN service area information as the LADN service area information indicating the conventional LADN service area in the context. In this case, the twelfth identification information may be conventional LADN information.

Further, in a case that the UE has received at least the twelfth identification information and is located in the LADN service area indicated by the received information, the UE may recognize that a PDU session for the LADN can be established or may initiate a PDU session establishment procedure for establishing the PDU session for the LADN. In other words, in a case that the UE has received at least the twelfth identification information and is located outside the LADN service area indicated by the received information, the UE may recognize that the PDU session for the LADN cannot be established or may be prevented from performing the PDU session establishment procedure for establishing the PDU session for the LADN.

Further, the UE may initiate the PDU session establishment procedure for establishing the PDU session for the LADN based on update of the LADN information and/or determination regarding whether or not the UE is located in the LADN service area. Specifically, the UE may initiate the PDU session establishment procedure for establishing the PDU session for the LADN based on determination that the UE is located in the LADN service area. On the contrary, each device may release the PDU session for the LADN or may release a user plane resource associated with the PDU session for the LADN, based on the determination that the UE is located outside the LADN service area.

Here, the determination regarding whether or not the UE is located in the LADN service area may be performed based on the extended LADN service area or may be performed based on the conventional LADN service area. In other words, in a case that each device stores the extended LADN service area, each device may determine whether or not the UE is in the LADN service area based on the extended LADN service area. On the contrary, in a case that each device stores the conventional LADN service area, each device may determine whether or not the UE is in the LADN service area based on the conventional LADN service area.

Further, in a case that the stored LADN service area is a tracking area ID list, whether or not the UE is located in the LADN service area may be determined based on comparison between the LADN service area information stored in the UE and the tracking area ID acquired from the RAN. Specifically, in a case that the tracking area ID acquired from the RAN is included in the LADN service area information stored in the UE, the UE may recognize that the UE is located in the LADN service area and store the recognized state. On the contrary, in a case that the tracking area ID acquired from the RAN is not included in the LADN service area information stored in the UE, the UE may recognize that the UE is located outside the LADN service area and store the recognized state.

Further, in a case that the stored LADN service area is information that requires assistance of the RAN, whether or not the UE is located in the LADN service area may be determined based on comparison between the LADN service area information stored in the UE and the information acquired from the RAN. Specifically, in a case that the information acquired from the RAN is included in the LADN service area information stored in the UE, the UE may recognize that the UE is located in the LADN service area and store the recognized state. On the contrary, in a case that the information acquired from the RAN is not included in the LADN service area information stored in the UE, the UE may recognize that the UE is located outside the LADN service area and store the recognized state.

Further, in a case that the stored LADN service area is information that does not require assistance of the RAN, whether or not the UE is located in the LADN service area may be determined based on comparison between the LADN service area information stored in the UE and the information acquired in a way other than the RAN. Specifically, in a case that the information acquired in a way other than the RAN is included in the LADN service area information stored in the UE, the UE may recognize that the UE is located in the LADN service area and store the recognized state. On the contrary, in a case that the information acquired in a way other than the RAN is not included in the LADN service area information stored in the UE, the UE may recognize that the UE is located outside the LADN service area and store the recognized state.

Also, the determination regarding whether or not the UE is located in the LADN service area may be performed based on transmission and reception of a control message transmitted from the network to the UE. Specifically, the UE may recognize that the UE is located in the LADN service area and store the recognized state based on reception of the control message from the network. On the contrary, the UE may recognize that the UE is located outside the LADN service area and store the recognized state based on reception of the control message from the network. Here, the control message transmitted from the network to the UE may be a control message for a Location Services (LCS), for example. Note that the determination regarding whether or not the UE is located in the LADN service area may not be limited thereto.

Further, the UE may recognize that a PDU session for the LADN can be established or initiate the PDU session establishment procedure for establishing the PDU session for the LADN in the period during which the LADN service area is valid. In other words, the UE may recognize that the PDU session for the LADN cannot be established or may be prevented from performing the PDU session establishment procedure for establishing the PDU session for the LADN, outside the period during which the LADN service area is valid.

Further, the UE may initiate the PDU session establishment procedure for establishing the PDU session for the LADN based on update of the LADN information and/or the determination of validation of the LADN service area. Specifically, the UE may initiate the PDU session establishment procedure for establishing the PDU session for the LADN based on validation of the LADN service area. On the contrary, each device may release the PDU session for the LADN established in association with the invalidated LADN service area or may release the user plane resource associated with the PDU session for the LADN, based on invalidation of the LADN service area.

Here, the determination of the validation of the LADN service area may be performed based on information indicating the period during which the LADN service area is valid. Specifically, in a case that the UE compares the period during which the LADN service area is valid with a current time and the current time is within the period during which the LADN service area is valid, the UE may determine that the LADN service area is valid. On the contrary, in a case that the UE compares the period during which the LADN service area is valid with the current time and the current time is outside the period during which the LADN service area is valid, the UE may determine that the LADN service area is invalid. Further, the UE may validate the associated LADN service area based on the initiation of the period during which the LADN service area indicated by the received information is valid. On the contrary, the UE may invalidate the associated LADN service area based on an end of the period during which the LADN service area indicated by the received information is valid.

Also, the determination of the validation of the LADN service area may be performed based on reception of the control message from the network. Specifically, in a case that the control message is received from the network, the UE may determine that the LADN service area is valid. Further, in a case that the control message cannot be received from the network, the UE may determine that the LADN service area is not valid. On the contrary, in a case that the UE has received reception of the control message from the network, the UE may determine that the LADN service area is not valid. Further, in a case that the control message cannot be received from the network, the UE may determine that the LADN service area is valid. Further, the UE may validate the LADN service area based on reception of the control message from the network. On the contrary, the UE may invalidate the LADN service area based on reception of the control message from the network. Note that the determination of the validation of the LADN service area may not be limited thereto. Further, in a case that the PDU session establishment procedure is a PDU session establishment procedure for establishing the PDU session for the LADN, each device may establish the PDU session for the LADN based on completion of the PDU session establishment procedure.

3.2.2. PDU Session Establishment Procedure

Next, an overview of the PDU session establishment procedure for establishing a PDU session for a DN will be described using FIG. 7. The PDU session establishment procedure is a procedure in the 5GS. In the following description, the present procedure indicates the PDU session establishment procedure. The PDU session establishment procedure is a procedure for each device to establish a PDU session. Note that each device can initiate the PDU session establishment procedure at an arbitrary timing in a registered state after the registration procedure is completed. Also, each device may be able to perform the PDU session establishment procedure in the registration procedure. Each device may establish the PDU session, based on completion of the PDU session establishment procedure. Note that the PDU session establishment procedure may be a procedure led and initiated by the UE or may be a procedure requested and initiated by the UE. Each device can establish a plurality of PDU sessions by performing the PDU session establishment procedure a plurality of times.

Further, in a case that the UE is located in an area where connection to the LADN can be made, and/or in a case that the UE is located in the LADN service area, the UE may initiate the PDU session establishment procedure to establish the PDU session for the LADN. On the contrary, in a case that the UE is located outside the LADN service area, the UE may be prevented from performing the PDU session establishment procedure to establish the PDU session for the LADN.

In other words, in a case that the UE is located in the area where connection to the LADN can be made, and/or in a case that the UE is located in the LADN service area, each device may perform the PDU session establishment procedure to establish the PDU session for the LADN. On the contrary, in a case that the UE is located outside the LADN service area, the network device may reject the request for the PDU session establishment procedure to establish the PDU session for the LADN.

First, the UE initiates the PDU session establishment procedure by transmitting an NAS message including a PDU session establishment request message to the SMF via the 5G AN (gNB) and the AMF (S900)(S902)(S904).

Specifically, the UE transmits the NAS message including the PDU session establishment request message to the AMF via the 5G AN (gNB) and via the N1 interface (S900). Note that the NAS message including the PDU session establishment request message may be an MM message. Further, the MM message may be an uplink NAS transport (UL NAS TRANSPORT) message. Here, expression that the identification information and/or a value is included in the PDU session establishment request message may indicate that the identification information and/or the value is included in the MM message including the PDU session establishment request message.

Here, although the UE can transmit at least the twenty sixth identification information with the twenty sixth identification information included in the PDU session establishment request message and/or the NAS message, the UE may transmit the twenty sixth identification information with the twenty sixth identification information included in a control message that is different from the PDU session establishment request message or the NAS message, for example, a control message of a lower layer of the RRC layer (for example, the MAC layer, the RLC layer, or the PDCP layer). The identification information may indicate a request from the UE by being included in these messages. Further, two or more pieces of identification information from the identification information may be configured as one or more pieces of identification information.

Further, the UE may indicate a request for establishing a PDU session correlated with the DNN indicated by the twenty sixth identification information or may indicate a DNN requested by the UE, by transmitting the twenty sixth identification information. Note that the twenty sixth identification information may be a DNN for identifying a DN that supports one or a plurality of functions indicated by identification information transmitted and received along with the twenty sixth identification information. Further, the twenty sixth identification information may be a DNN received in the registration procedure or may be an LADN.

Here, in a case that the PDU session establishment procedure is a PDU session establishment procedure for establishing a PDU session for the LADN, the UE may transmit a LADN DNN that is a DNN that can be used in connection to the LADN with the LADN DNN included in the PDU session establishment request message. Further, in the case that the PDU session establishment procedure is a PDU session establishment procedure for establishing a PDU session for the LADN, the UE may also transmit the LADN S-NSSAI that is an S-NSSAI that can be used in connection to the LADN with the LADN S-NSSAI included in the PDU session establishment request message or may also transmit the LADN S-NSSAI associated with the LADN DNN.

In these cases, the UE may select an LADN DNN to be included in the PDU session establishment request message from LADN DNNs included in the LADN information received before the PDU session establishment procedure is performed or may select an LADN DNN to be included in the PDU session establishment request message from LADN DNNs stored in the UE. Further, the UE may select a LADN S-NSSAI to be included in the PDU session establishment request message from LADN S-NSSAIs included in LADN information received before the PDU session establishment procedure is performed or may select an LADN S-NSSAI to be included in the PDU session establishment request message from LADN S-NSSAIs stored in the UE. Further, the UE may select an S-NSSAI associated with the LADN DNN to be included in the PDU session establishment request message and include the selected S-NSSAI in the PDU session establishment request message.

Further, in a case that a plurality of LADN DNNs are included in the LADN information received before the PDU session establishment procedure is performed, and/or in a case that a plurality of LADN DNNs are stored, the UE may select an LADN DNN based on the LADN service area information and transmit the selected LADN DNN with the LADN DNN included in the PDU session establishment request message. Further, in a case that a plurality of LADN S-NSSAIs are included in the LADN information received before the PDU session establishment procedure is performed, and/or in a case that a plurality of LADN S-NSSAIs are stored, the UE may select an LADN S-NSSAI based on the LADN service area information and transmit the selected LADN S-NSSAI with the LADN S-NSSAI included in the PDU session establishment request message. More specifically, in a case that information indicating a plurality of LADNs is included in the LADN information received before the PDU session establishment procedure is performed, and/or a case in which the information indicating the plurality of LADNs is stored, the UE may select information indicating a LADN based on the LADN service area information and transmit the LADN DNN included in the selected information indicating the LADN and/or the LADN S-NSSAI with the LADN DNN and/or the LADN S-NSSAI included in the PDU session establishment request message.

In a case that the AMF receives the NAS message including the PDU session establishment request message (S900), then the AMF extracts the PDU session establishment request message from the NAS message and selects the SMF as a transfer destination of the PDU session establishment request message (S902). Note that the AMF may select the SMF, which is a transfer destination, based on each piece of identification information included in the PDU session establishment request message and/or the NAS message, and/or subscriber information, and/or capability information of the network, and/or an operator policy, and/or a state of the network, and/or user registration information, and/or context held by the AMF, and/or the like.

The AMF transfers the PDU session establishment request message to the selected SMF via the N11 interface (S904).

In a case that the SMF receives the PDU session establishment request message (S904), then the SMF recognizes each piece of identification information included in the PDU session establishment request message. Then, the SMF performs third determination of whether condition is met. The third determination of whether condition is met is for the SMF to determine whether or not to accept a request from the UE. In the third determination of whether condition is met, the SMF determines whether or not the result of the third determination of whether condition is met is true. The SMF initiates the procedure in (A) of FIG. 7 in a case that the result of the third determination of whether condition is met is true, and the SMF initiates the procedure in (B) of FIG. 7 in a case that the result of the third determination of whether condition is met is false.

Note that the third determination of whether condition is met may be performed based on the PDU session establishment request message, and/or each piece of identification information included in the PDU session establishment request message, and/or subscriber information, and/or capability information of the network, and/or an operator policy, and/or a state of the network, and/or user registration information, and/or context held by the SMF, and/or the like. In a case that the network allows the request from the UE, for example, the result of the third determination of whether condition is met may be true. In addition, in a case that the network does not allow the request from the UE, the result of the third determination of whether condition is met may be false. Further, the result of the third determination of whether condition is met may be true in a case that the network that is a connection destination of the UE and/or the device in the network supports the function requested by the UE, and the result of the third determination of whether condition is met may be false in a case that the function requested by the UE is not supported. Furthermore, the result of the third determination of whether condition is met may be true in a case that identification information transmitted and received is allowed, and the result of the third determination of whether condition is met may be false in a case that the identification information transmitted and received is not allowed. Note that conditions for determining whether the result of the third determination of whether condition is met is true or false may not be limited to the aforementioned conditions.

Next, steps in a case that the result of the third determination of whether condition is met is true, that is, each step of the procedure in (A) of FIG. 7 will be described. The SMF selects a UPF that is a destination of establishment of a PDU session, transmits a session establishment request message to the selected UPF via the N4 interface (S906), and initiates the procedure in (A) of FIG. 7.

Here, the SMF may select one or more UPFs based on each piece of identification information acquired based on reception of the PDU session establishment request message, and/or subscriber information, and/or capability information of the network, and/or an operator policy, and/or a state of the network, and/or user registration information, and/or context held by the SMF, and/or the like. Note that in a case that a plurality of UPFs are selected, the SMF may transmit a session establishment request message to each of the UPFs.

The UPFs receive the session establishment request message from the SMF via the N4 interface (S906) and create context for the PDU session. Further, the UPFs transmit session establishment response messages to the SMF via the N4 interface based on the reception of the session establishment request message and/or the creation of the context for the PDU session (S908).

The SMF receives the session establishment response messages from the UPFs via the N4 interface as response messages to the session establishment request message (S908). The SMF may perform address allocation of an address to the UE based on reception of the PDU session establishment request message, and/or selection of the UPF, and/or reception of the session establishment response messages.

The SMF transmits a PDU session establishment accept message to the UE via the AMF based on reception of the PDU session establishment request message, and/or selection of the UPF, and/or reception of the session establishment response messages, and/or completion of the address allocation of the address to be allocated to the UE (S910) (S912).

Specifically, in a case that the SMF transmits the PDU session establishment accept message to the AMF via the N11 interface (S910), then the AMF that has received the PDU session establishment request message transmits an NAS message including the PDU session establishment accept message to the UE via the N1 interface (S912). Note that the PDU session establishment accept message may be an NAS message, which is a response message to the PDU session establishment request. Note that the PDU session establishment accept message may be transmitted and received via the N1 interface with the PDU session establishment accept message included in an MM message. Further, the MM message may be an NAS message and may be a downlink NAS transport (DL NAS TRANSPORT) message. Here, expression that identification information and/or a value is included in the PDU session establishment accept message may indicate that the identification information and/or the value is included in the MM message including the PDU session establishment accept message. Also, the PDU session establishment accept message can indicate that the establishment of the PDU session has been accepted.

Here, the SMF and the AMF may indicate that the request from the UE using the PDU session establishment request has been accepted, by transmitting the PDU session establishment accept message.

The SMF and the AMF may transmit at least the thirty sixth identification information with the thirty sixth identification information included in the PDU session establishment accept message. Note that the SMF and the AMF may indicate that the network supports each function or may indicate that the request from the UE has been accepted, by transmitting the identification information. Further, the two or more pieces of identification information from the identification information may be configured as one or more pieces of identification information. Note that the information indicating the support of each function and the information indicating a request of utilization of each function may be transmitted and received with the same identification information or may be transmitted or received as different identification information.

Further, the SMF and the AMF may indicate the acceptance of the PDU session establishment request correlated with the DNN indicated by the thirty sixth identification information or may indicate that the PDU session will be established, by transmitting the thirty sixth identification information. Further, the SMF and the AMF may indicate the DNN selected and determined by the network by transmitting the thirty sixth identification information. Note that the thirty sixth identification information may be a DNN for identifying a DN that supports one or a plurality of functions indicated by identification information transmitted and received along with the thirty sixth identification information. Further, the thirty sixth identification information may be the DNN transmitted in the registration procedure or may be the LADN.

Note that the SMF and the AMF may select and determine whether or not at least the thirty sixth identification information is to be included in the PDU session establishment accept message based on each piece of received identification information, and/or subscriber information, and/or capability information of the network, and/or an operator policy, and/or a state of the network, and/or user registration information, and/or context held by the AMF, and/or the like.

Also, the SMF and the AMF can include a selected and/or allowed PDU session ID in the PDU session establishment accept message. The SMF and the AMF can designate the PDU session type indicating the type of the selected and/or allowed PDU session. Note that as the PDU session type, any of IPv4, IPv6, IP, Ethernet, and Unstructured can be designated as described above. Also, the SMF and the AMF can include the SSC mode of the selected and/or allowed PDU session in the PDU session establishment accept message.

Further, the SMF and the AMF can include an approved QoS rule group in the PDU session establishment accept message. Note that one or a plurality of QoS rules may be included in the approved QoS rule group. Further, in a case that a plurality of QoS flows and/or a plurality of user plane wireless bears are established in the present procedure, a plurality of QoS rules may be included in the approved QoS rule group. On the contrary, in a case that only one QoS flow and/or only one user plane wireless bearer is established in the present procedure, one QoS rule may be included in the approved QoS rule group.

Further, the SMF may transmit information indicating that some requests from the UE have been rejected with the information included in the PDU session establishment accept message or may indicate the cause of the rejection of some requests from the UE by transmitting the information indicating that some requests from the UE have been rejected. Furthermore, the UE may recognize the cause of the rejection of some requests from the UE, by receiving the information indicating that some requests from the UE have been rejected. Note that the cause of the rejection may be information indicating that content indicated by the identification information received by the SMF is not allowed.

The UE receives the NAS message including the PDU session establishment accept message from the AMF via the N1 interface (S912). The UE may transmit a PDU session establishment complete message to the SMF via the AMF based on the reception of the PDU session establishment accept message and/or the NAS message including the PDU session establishment accept message (S914)(S916). The UE can detect that the request from the UE using the PDU session establishment request has been accepted, by receiving the PDU session establishment accept message.

Specifically, the UE transmits the PDU session establishment complete message to the AMF via the N1 interface (S914). In a case that the AMF receives the PDU session establishment completion message from the UE, the AMF transmits the PDU session establishment complete message to the SMF via the N11 interface (S916).

Note that the PDU session establishment complete message transmitted by the AMF to the SMF may be a response message to the PDU session establishment accept message transmitted from the SMF to the AMF in S910. Further, the PDU session establishment complete message may be an NAS message. Also, it is only necessary for the PDU session establishment complete message to be a message indicating that the PDU session establishment procedure will be completed.

In a case that the SMF receives the PDU session establishment complete message from the AMF via the N11 interface (S916), the SMF can perform the second determination of whether condition is met. The second determination of whether condition is met is to determine a type of the message on the N4 interface to be transmitted and/or received. In a case that the result of the second determination of whether condition is met is true, and that the SMF transmits a session change request message to the UPF via the N4 interface (S918), then the SMF receives a session change accept message transmitted as a response message thereto from the UPF (S920). In a case that the result of the second determination of whether condition is met is false, and that the SMF transmits a session establishment request message to the UPF via the N4 interface (S918), then the SMF receives a session change accept message transmitted as a response message thereto from the UPF (S920).

Note that the second determination of whether condition is met may be performed based on whether the session on the N4 interface for the PDU session has been established. For example, the result of the second determination of whether condition is met may be true in a case that the session on the N4 interface for the PDU session has been established, and the result of the second determination of whether condition is met may be false in a case that the session on the N4 interface for the PDU session has not been established. Note that conditions for determining whether the result of the second determination of whether condition is met is true or false may not be limited to the aforementioned conditions.

Each device completes the procedure in (A) in the PDU session establishment procedure based on transmission and reception of the PDU session establishment complete message, and/or transmission and reception of the session change response message, and/or transmission and reception of the session establishment response message. At a time when the procedure in (A) in the present procedure is completed, the UE is in a state in which the PDU session for the DN has been established. Here, in a case that the PDU session establishment procedure is a PDU session establishment procedure for establishing a PDU session for the LADN, each device may establish the PDU session for the LADN based on completion of the procedure in (A) in the present procedure.

Next, each step in the procedure in (B) in the PDU session establishment procedure will be described. The SMF transmits a PDU session establishment reject message to the UE via the AMF (S922)(S924). Specifically, the SMF transmits the PDU session establishment reject message to the AMF via the N11 interface (S922). In a case that the AMF receives the PDU session establishment request message from the SMF via the N11 interface (S922), then the AMF transmits the PDU session establishment reject message to the UE using the N1 interface (S924).

Further, the PDU session establishment reject message may be an NAS message or may be an SM message transmitted from the SMF to the UE. Also, the PDU session establishment reject message needs to be a message indicating that establishment of the PDU session has been rejected. Note that the PDU session establishment reject message may be transmitted and received via the N1 interface with the PDU session establishment reject message included in the MM message. Further, the MM message may be an NAS message and may be a downlink NAS transport (DL NAS TRANSPORT) message. Here, the expression that identification information and/or a value is included in the PDU session establishment reject message may indicate that the identification information and/or the value is included in the MM message including the PDU session establishment reject message.

Here, the SMF may indicate that the request from the UE using the PDU session establishment request has been rejected, by transmitting the PDU session establishment reject message. Further, the SMF may transmit the information indicating the cause of the rejection with the information included in the PDU session establishment reject message or may indicate the cause of the rejection by transmitting the cause of the rejection. Further, the UE may recognize the cause of the rejection of the request from the UE, by receiving the information indicating the cause of the rejection of the request from the UE. Note that the cause of the rejection may be information indicating that content indicated by the identification information received by the SMF is not allowed.

The SMF and/or the AMF may transmit at least the forty first identification information and/or a back-off timer value with the forty first identification information and/or the back-off timer value included in the PDU session establishment reject message, or may indicate that the request from the UE has been rejected or may indicate the cause of the rejection of the request from the UE by transmitting the forty first identification information and/or the back-off timer value.

Further, the SMF and/or the AMF may indicate that a request for establishing a PDU session for the LADN has been rejected or the PDU session for the LADN will not be established, by transmitting the forty first identification information. Further, the SMF and/or the AMF may indicate that the UE is outside the LADN service or may indicate that the PDU session for the LADN cannot be established in the current area. Further, the SMF and/or the AMF may indicate that the LADN information held by the UE is not valid or may indicate that the LADN information held by the UE requires to be updated, by transmitting the forty first identification information. Here, the LADN service area may be an LADN service area correlated with the LADN DNN requested by the UE.

Further, the SMF and/or the AMF may indicate to the UE to configure the back-off timer value to a transmitted value or may indicate to the UE to start the back-off timer in which the transmitted value has been configured, by transmitting the back-off timer value.

Further, in a case that the forty first identification information is information indicating that the UE is located outside the LADN service area, the SMF and/or the AMF may not include the back-off timer value in the PDU session establishment reject message. In other words, in a case that the forty first identification information is information other than information indicating that the UE is located outside the LADN service area, the SMF and/or the AMF may include the back-off timer value in the PDU session establishment reject message.

Here, the network device has transmitted the forty first identification information, the network device may indicate to the UE to delete the LADN information stored in the UE or may indicate to the UE to delete the LADN DNN requested by the UE from the LADN information stored in the UE. Further, in a case that the network device has transmitted the forty first identification information, the network device may indicate that the LADN DNN requested by the UE is invalid for the UE or may indicate to the UE to invalidate the LADN DNN requested by the UE.

Further, in a case that the network device has transmitted the forty first identification information, the network device may indicate to the UE to recognize that the LADN DNN provided in the PDU session establishment procedure is invalid or may indicate to the UE to invalidate the LADN DNN provided in the PDU session establishment procedure.

Further, in the case that the network device has transmitted the forty first identification information, the network device may perform registration procedure after completion of the present procedure or may initiate the generic UE configuration update procedure. Note that the registration procedure may be a registration procedure for mobility and registration update. Further, the registration procedure may be a procedure for providing new LADN information to the UE. Further, the generic UE configuration update procedure may be a procedure initiated by the AMF transmitting a configuration update command message to the UE or may be a procedure for providing new LADN information to the UE.

In other words, in a case that the transmitted 5GSM cause value is a cause value indicating that the UE is outside the LADN service, the network device may indicate to the UE to delete the LADN information stored in the UE or may indicate to the UE to delete the LADN DNN requested by the UE from the LADN information stored in the UE. Further, in a case that the transmitted 5GSM cause value is a cause value indicating that the network device is outside the LADN service, the network device may indicate that the LADN DNN requested by the network device is invalid for the UE or may indicate to the UE to invalidate the LADN DNN requested by the UE.

Further, in the case that the transmitted 5GSM cause value is a cause value indicating that the UE is outside the LADN service, the network device may indicate to the UE to recognize that the LADN DNN provided in the PDU session establishment procedure is invalid or may indicate to the UE to invalidate the LADN DNN provided in the PDU session establishment procedure.

Further, in the case that the transmitted 5GSM cause value is a cause value indicating that the UE is outside the LADN service, the network device may perform the registration procedure or may initiate the generic UE configuration update procedure after completion of the present procedure. Note that the registration procedure may be a registration procedure for mobility and registration update. Further, the registration procedure may be a procedure for providing new LADN information to the UE. Further, the generic UE configuration update procedure may be a procedure initiated by the AMF transmitting a configuration update command message to the UE or may be a procedure for providing new LADN information to the UE. Note that the SMF and/or the AMF may select and determine whether or not to include at least the forty first identification information in the PDU session establishment reject message based on each piece of received identification information, and/or subscriber information, and/or capability information of the network, and/or an operator policy, and/or a state of the network, and/or user registration information, and/or context held by the AMF, and/or the like. Specifically, in a case that the UE is located outside the LADN service area, the SMF and/or the AMF may include the forty first identification information in the PDU session establishment reject message. Note that the LADN service area may be an LADN service area correlated with the LADN DNN requested by the UE.

The UE can recognize that the request from the UE using the PDU session establishment request has been rejected and content of each piece of identification information included in the PDU session establishment reject message, by receiving the PDU session establishment reject message.

Figure 7:
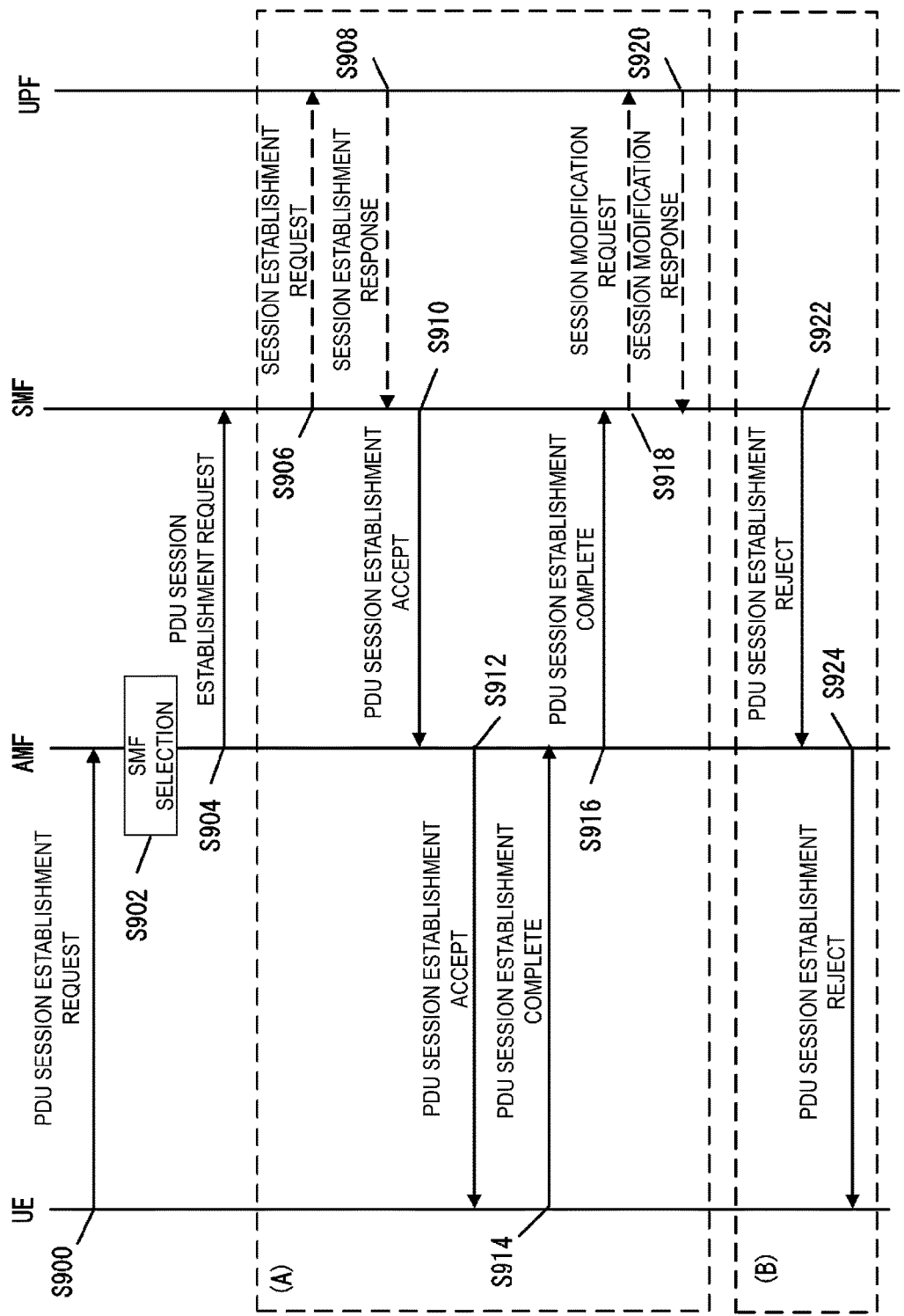
FIG. 7 is a diagram for explaining a PDU session establishment procedure.

Each device completes the PDU session establishment procedure based on the completion of the procedure in (A) or (B) of FIG. 7. Note that each device may transition to the state in which the PDU session has been established based on the completion of the procedure in (A) of FIG. 7, may recognize that the PDU session establishment procedure has been rejected based on the completion of the procedure in (B) of FIG. 7, or may transition to the state in which the PDU session has not been established. Moreover, the UE can communicate with the DN using the established PDU session by the procedure in (A) of FIG. 7 being completed.

Furthermore, each device may perform the processing based on the information transmitted and received in the PDU session establishment procedure based on the completion of the PDU session establishment procedure. In a case that each device has transmitted and received information indicating that some requests from the UE have been rejected, each device may recognize a cause of the rejection of the requests from the UE. Further, each device may perform the present procedure again or may perform the PDU session establishment procedure on another cell, based on the cause of the rejection of the requests from the UE.

Further, the UE may store the PDU session establishment accept message and/or the identification information received along with the PDU session establishment reject message or may recognize determination of the network, based on the completion of the PDU session establishment procedure.

In a case that each device has transmitted and received the thirty sixth identification information, for example, each device may establish the PDU session correlated with the DNN indicated by the thirty sixth identification information. Further, in a case that the UE has received the thirty sixth identification information, the UE may recognize that the PDU session correlated with the DNN indicated by the thirty sixth identification information will be established. Moreover, in a case that the UE has received the thirty sixth identification information, the UE may recognize the DNN selected and determined by the network. Note that the thirty sixth identification information may be a DNN for identifying a DN that supports one or a plurality of functions indicated by identification information transmitted and received along with the thirty sixth identification information. Further, the thirty sixth identification information may be a DNN received in the registration procedure or may be a LADN.

Further, in a case that the UE has received a back-off timer value, the UE may configure the back-off timer value in the back-off timer or may start the back-off timer in which the received back-off timer value has been configured. Here, even in a case that the UE has received the back-off timer value, the UE may ignore the received back-off timer value or may not start the back-off timer in a case that the UE receives the forty first identification information. On the contrary, even in a case that the UE has received the back-off timer value and the forty first identification information, the UE may configure the received back-off timer value in the back-off timer or may start the back-off timer in which the received back-off timer value has been configured.

Specifically, in a case that the UE has received the forty first identification information indicating that the UE is located outside the LADN service area, the UE may ignore the received back-off timer value or may not start the back-off timer. On the contrary, in a case that the UE has received the forty first identification information indicating other state than the state in which the UE is located outside the LADN service area, the UE may configure the received back-off timer value in the back-off timer or may start the back-off timer in which the received back-off timer value is configured.

Further, in a case that the UE has received the forty first identification information, the UE may initiate the PDU session establishment procedure under another condition based on completion of the present procedure and/or reception of the forty first identification information, after the completion of the present procedure. Note that in a case that the UE is performing the back-off timer, the UE may initiate the PDU session establishment procedure under another condition after counting of the back-off timer ends.

Here, the UE initiating of the PDU session establishment procedure under another condition may indicate, for example, that the UE initiate the PDU session establishment procedure by configuring a LADN DNN different from a LADN DNN previously transmitted in a DNN information element and transmitting the DNN information element to the network, may indicate that the UE initiates the PDU session establishment procedure by changing the area where the UE is located and then transmitting the PDU session establishment request message, or may indicate that the UE initiates the PDU session establishment procedure with a change as a combination of these reflected. Note that the UE may configure a LADN DNN selected again from the LADN information stored in the UE in the DNN information element.

Alternatively, the UE initiating the PDU session establishment procedure under another procedure may indicate that the UE may initiate the PDU session establishment procedure without using the LADN DNN. Specifically, the UE may request a PDU session for a target other than the 5GLAN by transmitting the LADN DNN without the LADN DNN included in the PDU session establishment request message.

In a case that the UE has received the forty first identification information, the UE may transition to a state in which the PDU session establishment procedure using the LADN DNN requested by the UE is not initiated, a state in which the PDU session establishment procedure is stopped, or a state in which the PDU session establishment procedure is prevented, after completion of the present procedure. Here, the PDU session establishment procedure using the LADN DNN requested by the UE may indicate a PDU session establishment procedure initiated by transmitting the PDU session establishment request message including the LADN DNN previously requested by the UE. In other words, in a case that the UE has received the forty first identification information, the UE may be prevented from performing the PDU session establishment procedure using the same LADN DNN or may be prevented from transmitting the PDU session establishment request message including the same LADN DNN.

In a case that the UE has received the forty first identification information, the UE may be prevented from transmitting the PDU session establishment request message including the same LADN DNN in the same PLMN until a change in state of the UE occurs after the completion of the present procedure. Here, the change in state of the UE may be turning-off of the power of the UE or may be removal of a USIM. Further, the change in state of the UE may be updating of information held by the UE. Here, the information held by the UE may be LADN information. Further, the updating of the information held by the UE may be performed in the registration procedure or may be performed in the generic UE configuration update procedure.

In other words, in a case that the UE has received the forty first identification information, the UE may be prevented from performing the PDU session establishment procedure for the same LADN in the same PLMN or may be prevented from transmitting the PDU session establishment request message for initiating the PDU session establishment procedure, until the registration procedure or the generic UE configuration update procedure is performed after the completion of the present procedure. In other words, in a case that the UE has received the forty first identification information, the UE may be prevented from transmitting the PDU session establishment request message including the same LADN DNN in the same PLMN until the registration procedure or the generic UE configuration update procedure is performed after the completion of the present procedure.

In a case that the UE has received the forty first identification information, the UE may transition to a state in which transmission of the PDU session establishment request message including the same LADN DNN is prevented during a specific period, may transition to a state in which transmission of the PDU session establishment request message including the same LADN DNN is prevented in the same PLMN, or may transition to a state in which transmission of the PDU session establishment request message including the same LADN DNN is prevented in the same area, after completion of the present procedure. Here, the specific period may be a period configured with the back-off timer value or may be another period configured by the network or the UE.

In a case that the UE has received the forty first identification information, the UE may delete the stored LADN information or may delete the LADN DNN requested by the UE from the stored LADN information. Further, in a case that the UE has received the forty first identification information, the UE may recognize that the LADN DNN requested by the UE is invalid or may invalidate the LADN DNN requested by the UE.

In other words, in a case that the UE has received the forty first identification information, the UE may recognize that the LADN DNN provided in the PDU session establishment procedure is invalid or may invalidate the LADN DNN provided in the PDU session establishment procedure.

Further, in a case that the UE has received the forty first identification information, the UE may initiate the registration procedure. Note that the registration procedure may be a registration procedure for mobility and registration update. Further, the registration procedure may be a procedure for requesting new LADN information. Further, in a case that the UE has received the LADN information in the registration procedure, the UE may store the received LADN information.

In other words, in a case that the UE has received the forty first identification information, the UE may request the LADN information. Here, the LADN information may be LADN information for the LADN DNN provided in the PDU session establishment procedure.

In other words, in a case that the received 5GSM cause value is a cause value indicating that the UE is outside the LADN service, the UE may delete the stored LADN information or may delete the LADN DNN requested by the UE from the stored LADN information. Further, in the case that the received 5GSM cause value is a cause value indicating that the UE is outside the LADN service, the UE may recognize that the LADN DNN requested by the UE is invalid or may invalidate the LADN DNN requested by the UE.

In other words, in the case that the received 5GSM cause value is a cause value indicating that the UE is outside the LADN service, the UE may recognize that the LADN DNN provided in the PDU session establishment procedure is invalid or may invalidate the LADN DNN provided in the PDU session establishment procedure.

Note that the expression that the LADN DNN is deleted may indicate that information indicating the LADN configured with the LADN DNN is deleted or may indicate that the LADN information including the LADN DNN is deleted. Further, the expression of recognizing the LADN DNN as being invalid may indicate recognizing that the information indicating the LADN information configured with the LADN DNN is invalid or may indicate recognizing that the LADN information including the LADN DNN is invalid. Further, the expression of invalidating the LADN DNN may indicate invalidating the information indicating the LADN configured with the LADN DNN or may indicate invalidating the LADN information including the LADN DNN.

Further, in a case that the received 5GSM cause value is a cause value indicating that the UE is outside the LADN service, the UE may initiate the registration procedure. Note that the registration procedure may be a registration procedure for mobility and registration update. Further, the registration procedure may be a procedure for requesting new LADN information. Further, in a case that the UE has received the LADN information in the registration procedure, the UE may store the received LADN information. Note that the UE may acquire the LADN information from the network by transmitting the registration request message including the second identification information in the registration procedure. Also, the UE may acquire the LADN information from the network even in a case that the UE has transmitted a registration request message that does not include the second identification information in the registration procedure.

In other words, the UE may request the LADN information in a case that the received 5GSM cause value is a cause value indicating that the UE is outside the LADN service. Here, the LADN information may be LADN information for the LADN DNN provided in the PDU session establishment procedure.

4. First Embodiment

Next, a first embodiment will be described. Hereinafter, the first embodiment will be referred to as the present embodiment. In a communication procedure according to the present embodiment, each device performs a registration procedure initiated by the UE first. Next, each device establishes a PDU session by performing a PDU session establishment procedure initiated by the UE and transitions to a state in which communication using a PDU session can be performed between the UE and the DN. Next, each device transmits and receives user data using the PDU session. The procedure according to the present embodiment is completed as described above.

Note that in the procedure according to the present embodiment, each device may exchange support information of the extension of the LADN service area and/or the LADN information between the UE and the network in the registration procedure.

Further, each device may establish the PDU session for the LADN between the UE and the network based on the information exchanged in the registration procedure in the PDU session establishment procedure. Note that the PDU session for the LADN may be a PDU session that can be established only in a case that the UE is present in a specific area. Here, the specific area may be, for example, an LADN service area.

Further, each device may perform communication of user data with the LADN using the established PDU session. Further, each device may release the established PDU session or may release the user plane resource associated with the established PDU session, based on update of the LADN information and/or a change in state of the LADN service area.

Further, in a case that the request for the PDU session establishment procedure is rejected, each device may not establish the PDU session. In this case, each device may perform processing based on the information included in the PDU session reject message after the completion of the PDU session establishment procedure or may complete the procedure in the present embodiment by performing the processing based on the information included in the PDU session reject message.

5. Modifications

A program running on a device according to the present invention may be a program that controls a central processing unit (CPU) and the like to cause a computer to operate in such a manner as to realize the functions of the embodiment according to the present invention. The program or information handled by the program are temporarily stored in a volatile memory such as a random access memory (RAM), a non-volatile memory such as a flash memory, a hard disk drive (HDD), or another storage device system.

Note that the program for realizing such functions of the embodiment according to the present invention may be recorded on a computer-readable recording medium. The functions may be realized by causing a computer system to read and perform the program recorded on the recording medium. It is assumed that the "computer system" refers to a computer system built into the device and that the computer system includes an operating system and hardware such as a peripheral device. Further, the "computer-readable recording medium" may be any of a semiconductor recording medium, an optical recording medium, a magnetic recording medium, a medium dynamically retaining the program for a short time, or any other computer-readable recording medium.

Further, each functional block or various characteristics of the device used in the aforementioned embodiment may be implemented or performed on an electric circuit, for example, an integrated circuit or a plurality of integrated circuits. An electric circuit designed to perform the functions described in the present specification may include a general-purpose processor, a digital signal processor (DSP), an application specific integrated circuit (ASIC), a field programmable gate array (FPGA), other programmable logic devices, discrete gates or transistor logic, discrete hardware components, or a combination thereof. The general-purpose processor may be a microprocessor or may be a processor of a known type, a controller, a micro-controller, or a state machine. The aforementioned electric circuit may be configured with a digital circuit or may be configured with an analog circuit. In a case that with advances in semiconductor technology, a circuit integration technology that replaces the present integrated circuits appears, it is also possible to use a new integrated circuit based on the technology in one or a plurality of aspects of the present invention.

Note that the invention of the present application is not limited to the aforementioned embodiment. Although one example of the device has been described in the embodiment, the invention of the present application is not limited to thereto and is applicable to a terminal device or a communication device of a fixed-type or a stationary-type electronic device installed indoors or outdoors, for example, an AV device, a kitchen device, a cleaning or washing machine, an air-conditioning device, office equipment, a vending machine, and other household devices.

Although the embodiment of the present invention has been described in detail above referring to the drawings, the specific configuration is not limited to the embodiment and includes an amendment and the like to a design that falls within the scope that does not depart from the gist of the present invention. Various modifications can be made within the scope of the present invention defined by claims, and embodiments that are made by suitably combining technical means disclosed in different embodiments are also included in the technical scope of the present invention. Further, a configuration in which constituent elements described in each embodiment and exhibiting similar effects are substituted with one another is also included in the technical scope of the present invention.

The invention claimed is:

1. A User Equipment (UE) comprising:
transmitting and receiving circuitry configured to:
in a UE-requested Protocol Data Unit (PDU) session establishment procedure,
transmit a PDU session establishment request message to a control device in a core network; and
receive a PDU session establishment reject message including a 5GS Session Management (5GSM) cause value from the control device; and
a controller,
wherein
the controller initiates the UE-requested PDU session establishment procedure with Local Area Data Network (LADN) Data Network Name (DNN) to establish a PDU session for LADN,
in a case that the 5GSM cause value indicates the UE is out of LADN service area, the controller configures the transmitting and receiving circuitry not to send a PDU session establishment request message with the LADN DNN until LADN information for the LADN DNN is updated.

2. The UE according to claim 1, wherein
the LADN information is updated by performing a generic UE configuration procedure or a registration procedure.

3. A control device in a core network comprising:
transmitting and receiving circuitry configured to:
in a UE-requested Protocol Data Unit (PDU) session establishment procedure,
receive a PDU session establishment request message from a User Equipment (UE); and
transmit a PDU session establishment reject message to the UE, and
a controller,
wherein
the controller performs the UE-requested PDU session establishment procedure with Local Area Data Network (LADN) Data Network Name (DNN) to establish a PDU session for LADN,
in a case that the UE is located outside of LADN service area,
the controller includes, in the PDU session establishment reject message, a 5GS Session Management (5GSM) cause value indicating the UE is out of LADN service area, and
the control device configures the UE not to send a PDU session establishment request message with the LADN DNN until LADN information for the LADN DNN is updated.

4. The control device according to claim 3, wherein the LADN information is updated by performing a generic UE configuration procedure or a registration procedure.

5. A communication control method performed by a User Equipment (UE), the communication control method comprising:
in a UE-requested Protocol Data Unit (PDU) session establishment procedure,
transmitting a PDU session establishment request message to a control device in a core network; and
receiving a PDU session establishment reject message including a 5GS Session Management (5GSM) cause value from the control device,
wherein
the UE initiates the UE-requested PDU session establishment procedure with Local Area Data Network (LADN) Data Network Name (DNN) to establish a PDU session for LADN,
in a case that the 5GSM cause value indicates the UE is out of LADN service area, the UE does not send a PDU session establishment request message with the LADN DNN until LADN information for the LADN DNN is updated.

* * * * *